(12) United States Patent  
Kling

(10) Patent No.: US 7,991,221 B1  
(45) Date of Patent: Aug. 2, 2011

(54) DATA PROCESSING SYSTEM UTILIZING TOPOLOGICAL METHODS TO MANIPULATE AND CATEGORIZE N-DIMENSIONAL DATASETS

(76) Inventor: Daniel H. Kling, Ringoes, NJ (US)

(*) Notice: Subject to any disclaimer, the term of this patent is extended or adjusted under 35 U.S.C. 154(b) by 1063 days.

(21) Appl. No.: 11/682,822

(22) Filed: Mar. 6, 2007

Related U.S. Application Data

(60) Provisional application No. 60/779,661, filed on Mar. 6, 2006.

(51) Int. Cl.  
*G06K 9/00* (2006.01)  
*G06K 9/46* (2006.01)

(52) U.S. Cl. ........................................ 382/154; 382/204

(58) Field of Classification Search .................. 382/154, 382/203–204, 279  
See application file for complete search history.

(56) References Cited

U.S. PATENT DOCUMENTS

| | | | | |
|---|---|---|---|---|
| 5,933,150 | A * | 8/1999 | Ngo et al. | 345/473 |
| RE38,559 | E * | 7/2004 | Caspi et al. | 382/141 |
| 7,139,985 | B2 * | 11/2006 | Jones | 716/1 |
| 7,646,882 | B2 * | 1/2010 | Muratani | 382/100 |
| 2005/0232511 | A1 * | 10/2005 | Ziou et al. | 382/276 |
| 2007/0036434 | A1 * | 2/2007 | Saveliev | 382/173 |

OTHER PUBLICATIONS

Allili, et al. (Cubical Homology and the Topological Classification of 2D and 3D Imagery), IEEE, 2001, pp. 173-173-176.*

* cited by examiner

*Primary Examiner* — Daniel G Mariam

(57) ABSTRACT

Methods are constructed for defining equivalence relations on embedded manifolds. A continuous path in the space of equivalence relations that spans from "homologous" to "diffeomorphic" and another similar path with endpoints "homologous" and "isometric" are given. Underlying the methodology is a convolution algebra of homology sampling functions. The methodology has applications for describing geometrical arrangements in material science, molecular biology, data science and physics. The methods are implemented in program code stored in a computer readable media and executable on a computer system to provide data analysis functions for a user.

17 Claims, 16 Drawing Sheets

DATA PROCESSING SYSTEM UTILIZING TOPOLOGICAL METHODS TO MANIPULATE AND CATEGORIZE N-DIMENSIONAL DATASETS

CROSS-REFERENCE TO RELATED APPLICATIONS

This application claims the benefit of U.S. Provisional Application No. 60/779,661 filed on Mar. 6, 2006, which is herein incorporated by reference in its entirety.

FIELD OF THE INVENTION

The present invention relates generally to data processing systems. More specifically, the present invention discloses a data processing system that utilizes topological functions to categorize and analyze n-dimensional datasets.

BACKGROUND OF THE INVENTION

Characterizing the three-dimensional structure of objects has fundamental value across many industries and areas of research. Applications include the analysis of existing materials, synthesizing new materials, and predictive correlations for how these materials perform under various conditions. For example the shape of a protein chain may contribute to its effectiveness as a drug, and understanding the shape may lead to similarly designed or improve drugs. The same goes for developing high performance materials in other fields.

Currently to characterize the morphology of an object or material one may use geometric properties such as length, angle, and curvature to define quantities to bring out the features of importance. For example, a cell has a diameter that may be defined in various ways such as the diameter of the smallest circumscribed or largest inscribed sphere. The volume of a cell is also defined by using the product of length differentials $\int\int\int \ldots$ dxdydz. These geometric properties are based on distance measurement and have value for conducting research and developing technologies into perhaps every branch of science.

Current geometrical methods used to categorize or analyze datasets are unable to extract or process morphological features that humans routinely take for granted. However, morphological features are also extremely important criteria along which data may be analyzed and categorized. Accordingly, there is an immediate need for computing systems that can generally categorize data based upon the morphological properties of the data.

SUMMARY OF THE INVENTION

Computing systems that are capable of processing data using topological functions are generally described. In one aspect, a computer system is disclosed that is adapted to compute the homology integral of an input dataset. The homology integral provides an extension of Betti numbers to fuzzy sets and functions, generally, and thus provides a mathematical description of the topological characteristics of the data set that may be used to analyze and characterize the data set.

A computer system comprises a processor in communications with a memory for storing program code and a dataset. The program code is executable by the processor to obtain the homology integral of the dataset. The program code contains steps that enable the processor to input an n-dimensional dataset f into the memory. In one embodiment, the dataset f has a maximum value max(f), and the program code causes the processor to generate the k+1 discretization points $(s_0, \ldots, s_k)$, which may range, for example, from zero to max(f). The program code then causes the processor to compute the $i^{th}$ Betti value of the homology integral for the dataset f, $\mathcal{H}_i(f)$, by computing $$\sum_{j=1}^{k-1} \frac{s_{j+1} - s_{j-1}}{2} \cdot dimH_i(f^{-1}[s_j, \infty)).$$

The program code may cause the processor to compute $\mathcal{H}_i(f)$, for all i from 0 to n. In some embodiments select indices may be omitted. The program code finally comprises steps for outputting the $\mathcal{H}_0(f), \ldots, \mathcal{H}_n(f)$, or for outputting data related to the $\mathcal{H}_0(f), \ldots, \mathcal{H}_n(f)$.

In another embodiment, the program code contains steps to input an n-dimensional dataset f. The program code then causes the processor to compute k+1 transition values $(t_0, \ldots, t_k)$, and then to compute the $i^{th}$ Betti value for the homology integral by computing $$\sum_{j=0}^{k-1} (t_{j+1} - t_j) \cdot dimH_i\left(f^{-1}\left[\frac{t_j + t_{j+1}}{2}, \infty\right)\right).$$

The program code may cause the processor to compute $\mathcal{H}_i(f)$, for all i from 0 to n. In some embodiments select indices may be omitted. The program code finally comprises steps for outputting $\mathcal{H}_0(f), \ldots, \mathcal{H}_n(f)$, or for outputting information derived from $\mathcal{H}_0(f), \ldots, \mathcal{H}_n(f)$.

In another aspect, a computer system is provided that performs a discrete homology convolution, which analyzes a first dataset f with a probe dataset g. The program code causes the processor to partition the dataset f into m regions $k_1, \ldots, k_m$, in which $b_j$ is a chosen element of the $j^{th}$ region $k_j$. In certain embodiments, for each j in $1 \ldots, m$, the program code causes the processor to construct $C_j : k_j \to \mathbb{R}^+$.

In certain embodiments $C_j$ is a constant function, assigning to each point in $k_j$ the indexed values $\mathcal{H}(f \wedge g_{b_j}), \ldots, \mathcal{H}_n(f \wedge g_{b_j}))$. For each i in $(0, \ldots, n)$, $C_{ji} = \mathcal{H}_i(f \wedge g_{b_j}))$. The function $C_j$ may be represented in a computer in any form suitable for functions. It may be preferable to represent $C_j$ as an indexed constant function by using a representation for the set $k_j$ and having a rule that associates to the elements of $k_j$ the values $\mathcal{H}_i(f \wedge g_{b_j})$, for i=0, ..., n.

The program code causes the processor to construct $F_j : \mathbb{R}^n \to \mathbb{R}^+$ by assembling F from the disjoint union of the $C_j$. So $F_i(x) = C_{ji}$, where j is selected according to the region $k_j$ containing x. In some embodiments if the partition does not cover $\mathbb{R}^n$ then F may return the value $(0, \ldots, 0)$ outside the partition. The function F may be represented in any form suitable for functions. It may be represented in a form suitable for an indexed family of step functions, such as a rule containing the partition information and the constant Betti numbers assigned to each set in the partition.

In other embodiments when the input data are sets X, Y in n-dimensional space, the procedure above may be applied with $C_j = H(X \cap Y_{b_j})$.

In other embodiments, the program code further contains code that allows a user to select the probe g. In yet other embodiments, the program code enables the user to design the probe g. In other embodiments the roles of f and g may be interchanged.

In various embodiments the data f will represent a function from $\mathbb{R}^n$ to $\mathbb{R}^+$. In some embodiments the data f will represent function from X to Y, where $X \subset \mathbb{R}^n$ and $Y \subset \mathbb{R}$. The data f may be given by discretizing a set containing the support of f, and supplying the values of f on the discretized supports. In certain embodiments the data f may be given by supplying numerical coordinates for nodes on the graph of f, and piecewise linear, NURBS or other interpolation methods on the nodes. In other embodiments the data f may be given by supplying data that generates an approximation for a function. In yet other embodiments the data f may be given by supplying data that symbolically describes a function. Alternatively, the data f may be given by supplying data that generates an approximation for a set and/or characteristic function. Or, the data f may be given by supplying data that symbolically describes a set and/or characteristic function. Combinations of these internal representation methods for f may also be used. The data g may have any of the forms that f may have, including those just described.

In another aspect, a computer system is provided that performs an interpolative homology convolution, which analyzes a first dataset f with a probe dataset g. The program code causes the processor to perform the following steps. As an inital step, the processor selects k data points $(y_1, \ldots, y_k)$. Then, a plurality of values $C_{ij}$ for i from 0 to n, and j from 1 to k, are computed using the formula $C_{ij} = \langle f,g \rangle_i(k_j) = \mathcal{H}_i(f \wedge g_{k_j})$, i.e. $C_j = \langle f,g \rangle(k_j) = \mathcal{H}(f \wedge g_{k_j})$. A value $m \leq k$ is selected. The program code then causes the processor to construct a rule or function F for evaluating F(x) as follows: For each point x to be evaluated, the program code causes the processor to select m data points $(y_{j_1}, \ldots, y_{j_m})_x$ from $(y_1, \ldots, y_k)$. In some embodiments these may be the m points of $(y_1, \ldots, y_k)$ that are closest to x. The program code causes the processor to compute $F_i(x)$ by interpolating between the points $(y_{j_1}, \ldots, y_{j_m})_x$ with respective values $(C_{ij_1}, \ldots, y_{ij_m})$. In some embodiments, the interpolation may be done by assigning weights to the $y_{j_i}$ in $(y_{j_1}, \ldots, y_{j_m})_x$ related to the reciprical of the distance from x to $y_{j_i}$ and computing the corresponding weighted average of the $C_{ij}$ values. Preferably the program code causes the processor to output the function $F = (F_0, \ldots, F_0)$, or output data derived from the function $F = (F_0, \ldots, F_0)$. In certain embodiments F is specified in terms of the $C_{ij}$ values and interpolation data.

In the following, the term geometric object includes data that represents 1) subsets of $\mathbb{R}^n$, 2) functions whose domain or range is included in $\mathbb{R}^n$, 3) information that is substantially constructed by set or tensor operations and other constructions familar in algebraic topology on 1), 2), or subclasses of 1) or 2). In particular data representing lists or sets of subsets of $\mathbb{R}^n$ or lists or sets of functions f: $\mathbb{R}^n \to \mathbb{R}$ are geometric objects, as are compound structures including CW-complexes. Also $\mathbb{R}^n$ is called an underlying n-space of f, if n is such that $\mathbb{R}^n$ appears in the definition of f as a geometric object.

A topological invariant numerical function, also called a topological numeric, for a class $\mathcal{C}$ of geometric objects is a method or rule for assigning numerical values to the geometric objects in the class in such a way that homeomorphic geometric objects are assigned the same value. The topology for the geometric objects in the class may be specified with the description of the topological numeric. In various embodiments, topological numerics will be presented in indexed families. For example, this includes the homology Betti numbers, the relative homology Betti numbers, the various cohomology Betti numbers, and the family of ranks of the homotopy groups.

For G a topological numeric defined on a class $\mathcal{C}$ of geometric objects, in various embodiments we may construct the function $\mathcal{G}$, called the G-integral, defined on functions f:Dom$\to \mathbb{R}$, by $$\mathcal{G}(f) = \int_0^\infty G(f^{-1}[t, \infty)) dt.$$

Here Dom $\subset \cup \mathcal{C}$ and f is such that $f^{-1}[t,\infty) \in \mathcal{C}$ for all values of t. For example, when $G_i = \dim H_i$ then the $G_i$-integral is the homology integral $\mathcal{H}$.

With classes $\mathcal{C}_1$, $\mathcal{C}_2$, $\mathcal{C}C_3$ of geometric objects having a common underlying n-space $\mathbb{R}^n$, $\mathcal{C}_2$ closed under translation in $\mathbb{R}^n$, and function $*: \mathcal{C}_1 \times \mathcal{C}_2 \to \mathcal{C}_3$ and topological numeric $G: \mathcal{C}_3 \to \mathbb{R}^n$ selected, in some embodiments we compute the G*-convolution for $X_1 \in \mathcal{C}_1, X_2 \in \mathcal{C}_2$ defined by the formula $\langle\langle X,Y \rangle\rangle(x) = G(X*Y_x)$. Here $Y_x$ is the translation of Y by X. When G is an indexed family of topological numerics, in certain embodiments the convolution may be extended to give an indexed family of values at each point x. For example, with X,Y: $\mathbb{R}^n \to \mathbb{R}^+$, G=dimH and $*=\wedge$, then $\langle\langle X,Y \rangle\rangle_i(x) = G_i(X*Y_x) = \dim H_i(X \wedge Y_x) = \langle X,Y \rangle_i(x)$ and similarly with $*=\cdot$ multiplication, $\langle\langle X,Y \rangle\rangle_i(x) = G_i(X \cdot Y_x) = \langle X,Y \rangle_i(x)$. In other embodiments the convolution may be defined with * operating on m-tuples of geometric objects, including the technique shown in Example 16. These embodiments and related embodiments involving a convolution procedure and a topological numeric are called are called topological convolutions.

These and other aspects will become clear to one of ordinary skill in the art after reading the following detailed description.

DETAILED DESCRIPTION

§Overview

Figure 1:
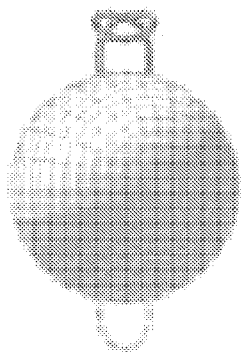
FIG. 1 is a comparison between four solids.
Figure 1:
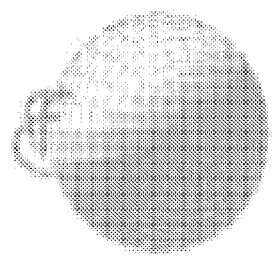
Figure 1:
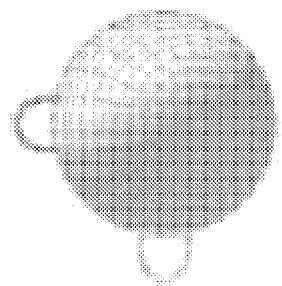
Figure 1:
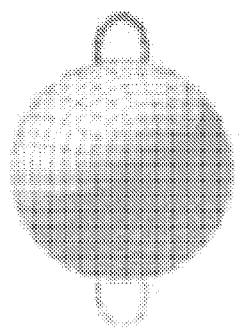

The morphology of a material or object may be described in very general terms using topology. This branch of mathematics gives quantities describing an object that are not dependent on specific length measurements. Usually the quantities take on integer values, such as the number of connected components, the number independent circuits, or the number of independent closed surfaces an object may have. For example the letter "B" has 1 connected component, 2 independent circuits and 0 independent closed surfaces; the letter "i" has 2 connected components, 0 independent circuits and 0 independent closed surfaces; a beach ball has 1 connected component, 0 independent circuits and one independent closed surface, and an inner tube (torus) has 1 connected component, 2 independent circuits, and 1 independent closed surface. The respective quantities would not change if the object were distorted continuously.

These topological quantities counting the number of connected components, the independent closed circuits, and independent closed surfaces of an object or material X are denoted by $|H_0(X)|$, $|H_1(X)|$, $|H_2(X)|$ respectively, and are called the homology Betti numbers of X. Many similar quantities familiar in topology including cohomology, K-theory, and homotopy groups may be used analogously. Because the topological quantities do not depend on scale or proportion they are very useful for describing overall structure. For example, $|H_1(X)|$ gives the number of holes in a rubber sheet X regardless of the individual shapes and overall arrangement of the holes. Software is publicly available to determine the homology of X. If X and Y are both circular rings, then using a property called relative homology one may immediately determine if the rings are linked or not. It would be difficult to provide this information using geometric properties based on length.

From a basic point of view many intuitive descriptions of objects X lie somewhere in between geometry and topology: Despite the contrary from topology, a ring appears linked on a finger, and a cup, due to gravity, is a closed surface for holding a beverage. What is needed is an algorithmic procedure for defining these intuitive properties of morphology.

The new methodology and related computer systems described herein gives a precise procedure for defining these useful morphology characteristics. The technology extends beautifully to describe biological tissue configurations, complex composite materials, and numerous other applications. The methodology also describes abstract configurations defined in arbitrary dimension, including financial data or experimental data in higher dimension. The technology may also be used to enhance existing data for clarity and interpretation, and to evolve data for other purposes.

The methods and related systems disclosed herein have applications for describing geometrical arrangements in material science, molecular biology, data science and physics, to name but a few. It also enables incomplete data to be enhanced to reveal its underlying structure, and for data to be evolved for interpretation and simulation. The methodology is in general a new language for interpreting and manipulating data, in particular for data describing objects in three-dimensional space.

Some of the novel steps described in the technical sections are repeated here in relatively simple terms. A complete description along with many other novel steps and procedures is given in the more technical description that follows this brief overview. Various embodiment steps include:
1. The generation of Betti numbers for fuzzy sets or functions,
2. Computing the homology convolution function,
3. Resolving the homology convolution function, and
4. Iterations of the convolution.

For the first advance, we may generalize the Betti homology numbers to non-integer values. For a set $X \subset \mathbb{R}^3$, for $i=0, 1, 2$ the $i^{th}$-homology of X is the vector space $H_i(X)$, and $\dim H_i(X) = |H_i(X)|$ gives the dimension of the vector space, called the $i^{th}$-homology Betti number of X. An innovation is to generalize from sets to fuzzy sets or functions with domain X.

Roughly speaking the points with highest values are in some sense the inner center of X, and we are successively widening the center to include points of lower values, taking the Betti numbers as we go and summing up the results by integration. For $f: X \to \mathbb{R}$ recall that $f^{-1}([t, \infty)) = \{x \in \mathbb{R}^3 | f(x) \geq t\}$. Define $$\mathcal{H}_i(f) = \int_0^\infty \dim H_i(f^{-1}[t, \infty)) \, dt$$

dt and then $\mathcal{H}(f)$ may be called the homology integral of f. So $\mathcal{H}_0(f)$, $\mathcal{H}_1(f)$, $\mathcal{H}_2(f)$ relate to the number of connected components, independent circuits, and independent closed surfaces of $f^{-1}([t, \infty))$.

For each set $X \subset \mathbb{R}^3$ there is the standard characteristic function $\chi_X : \mathbb{R}^3 \to \mathbb{R}^+$ that takes the value 1 on X and 0 at all point not in X. We may use this function in place of X so $$\mathcal{H}(X) = \mathcal{H}(\chi_X) = \int_0^\infty \dim H(\chi_X^{-1}[t, \infty)) \, dt =$$

$$\int_0^1 \dim H(\chi_X^{-1}[t, \infty)) \, dt + \int_1^\infty \dim H(\chi_X^{-1}[t, \infty)) \, dt =$$

$$\int_0^1 \dim H(\chi_X^{-1}[t, \infty)) \, dt + (0, 0, 0) = \dim H(X).$$

Generally if there is no source of confusion we will use sets and their characteristic function interchangeably in this way.

The second innovation described is the convolution. This takes the two sets X,Y or functions, and combines them to give local Betti numbers at each point in space. This may be done in the case of sets by considering X fixed and for each point x in space let $Y_x$ denote the translate of Y by x. Then we may define $\langle X,Y \rangle$ by $\langle X,Y \rangle(x) = \dim H(X \cap Y_x)$. (For functions f,g we may define $$\langle f, g \rangle(x) = \mathcal{H}(f \cdot g_x) = \int_0^\infty \dim H(f \cdot g_x)^{-1}[t, \infty)) \, dt.)$$

For example if X is a block of material with morphology under investigation, Y may be considered a standardized core sample. So $Y_x$ means take the core sample centered at x, and $X \cap Y_x$ cuts the sample from X. Thus $\mathcal{H}_i(X \cap Y_x)$ gives the Betti numbers of the cut piece, and $\langle X,Y \rangle_i(x)$ shows the Betti numbers dependent on the location x where the sample is taken.

The overall effect is to consider the homology of X locally at each point x in a neighborhood of shape Y. This enables the broad structural concepts of homology to be customized by the geometry of Y. Y may be used as a probe to interpret X. The user also has complete flexibility in defining Y to elicit the features of X of interest to the given application.

Often the convolution ⟨X,Y⟩ may be calculated for a broader purpose of determining if X has a specific property or for describing a specific characteristic of X. The function ⟨X,Y⟩=(⟨X,Y⟩$_0$, ⟨X,Y⟩$_1$, ⟨X,Y⟩$_2$) may need to be manipulated. For example, if X is a porous material and Y is a small ball, low ⟨X,Y⟩$_0$ values with high ⟨X,Y⟩$_1$ and ⟨X,Y⟩$_2$ values may indicate good mechanical load transfer properties, and high ⟨X,Y⟩$_1$ values may correspond to permeability. Once saturated high ⟨X,Y⟩$_0$ and high ⟨X,Y⟩$_2$ values may affect the retention of liquids in terms of adhesion and encapsulation, respectively. In this example, the user may then take weighted sums of the ⟨X,Y⟩$_i$, or form other combinations to produce a performance function p for the material X to compare locations x∈X for uniformity in p(x). The quantity p(x) may be integrated over a fixed sample size to compare various manufacturing procedures for making X. Samples $X^{(1)}, \ldots, X^{(k)}$ may be catagorized as good or bad by their score in this integration, or grades may be assigned to the materials. This performance function may also be used for comparing different material compositions.

Depending on the application, linear and non-linear combinations of the ⟨X,Y⟩$_i$(x), including taking pre-images and integrations, and combinations with metric quantities, may be selected to resolve the output of the convolution into more useful or accessible information.

In various embodiments for a given application, Y and the combination procedure for resolving ⟨X,Y⟩(x) may be selected together in consideration of their mutual consequence. Likewise in certain embodiments the selection of g and the combination procedure may be selected for their collaborative effect. One of the values of this technology is that it provides a framework within which the user may select with great freedom and versatility the convolution probe Y or g and the convolution resolution procedure. With this framework and versatility the user may very precisely address the most numerous of morphology and configuration characteristics.

The third innovation discussed in general terms is the iteration. The convolution ⟨X,Y⟩(x) gives three (when $X, Y \subset \mathbb{R}^3$) Betti numbers at each point x. ⟨X,Y⟩$_0$(x), ⟨X,Y⟩$_1$(x), ⟨X,Y⟩$_2$(x) are respectively the number of connected components, independent circuits, and independent closed surfaces of X∩Y$_x$. In the case of ⟨f,g⟩$_i$(x) these three values may be non-integer. In either case by choosing i=0,1,2 we get a function $F_i(x)=⟨X,Y⟩_i(x)$ or $F_i(x)=⟨f,g⟩_i(x)$. The $F_0$, $F_1$, $F_2$ functions may then be evaluated as $\mathcal{H}(F_i)$ or the convolution may be reiterated as ⟨F$_i$,Z⟩(x) for a new probe set Z. In short, ⟨X,Y⟩extracts from X three point clouds $F_0$, $F_1$, $F_2$ which in turn may be analyzed again by selection of Z and evaluating ⟨F$_i$,Z⟩. These functions may also be linearly or non-linearly combined to produce other functions $F_i$, i≧3, such as $F_{10}=F_0+F_1-F_2/2$, and these functions may also be reduced to sets or characteristic functions by taking thresholds such as $\chi_{F_i^{-1}[t,\infty)}$ and other pre-images. The resulting sets and functions may then be iterated through another convolution to further extract the morphology data. For example, we may evaluate ⟨X,F$_j$⟩, ⟨X∨F$_i$,F$_j$⟩, ⟨F$_i$,F$_j$⟩, and many other variations including using funtion pairs for relative homology such as ⟨X,(F$_i$,F$_j$)⟩

It is also understood that it is sometimes preferable to substitute other topological invariants including cohomologies and K-theory into the procedures described herein. The substitutions may be done verbatim and should be thought of as implicitly disclosed in the following with each step described in terms of homology.

The techniques and generalizations described in the technical sections allow many kinds of morphology to be described that previously were non-quantifiable. In our regular three-dimensional space, this includes fiber arrangements, cellular structures, capillary patterns, bone tissue, coral-like structures, surface relief patterns, configurations in multiple materials, morphology densities and directional orientations, protein chain structures, nets and webs, object recognition, and many other structures that are commonly seen under a microscope. For example, having clusters of nodules surrounding their perimeter identifies some types of cancerous cells; the bundling characteristics of these nodule clusters may be quantified using this technology to enable computer scanning of tissue for cancer cells.

The methods disclosed give a broad tool for describing geometric configurations. Because of the nature of the invention it is conveyed most readily by using a mathematical vocabulary, with definitions and theorems interspersed with many examples. Many proofs are found in the provisional patent to which this application claims the benefit, and which is included herein by reference in its entirety.

§Betti Numbers for $f: X \to \mathbb{R}^+$

By considering $X \subset \mathbb{R}^n$ as a characteristic function or more generally as the support of a function $f: \mathbb{R}^n \to \mathbb{R}^+$ we can generalize from the homology of sets to the homology of functions. Homology in this paper is preferably over the field $\mathbb{R}$.

Definition 1. Let $f: \mathbb{R}^n \to \mathbb{R}^+ = [0,\infty)$ be given. Define the n-tuple of Betti numbers $\mathcal{H}(f)$ by for i<n $$\mathcal{H}_i(f) = \int_0^\infty \dim H_i(f^{-1}[t, \infty)) \, dt$$

$\mathcal{H}(f)$ is called the homology integral of f

Note in the notation $f^{-1}([t,\infty))$ has been abbreviated to $f^{-1}[t,\infty)$. In general the integral may take the value $+\infty$ but is well defined since the integrand is always positive. If one allows $X \subset \mathbb{R}^n$ to represent its characteristic function $\chi_X$ we have $\mathcal{H}(X)=\mathcal{H}(\chi_X)=\dim(H(X))$. In some embodiments we use $f: \mathbb{R}^n \to I=[0,1]$ or bounded f.

Figure 2:
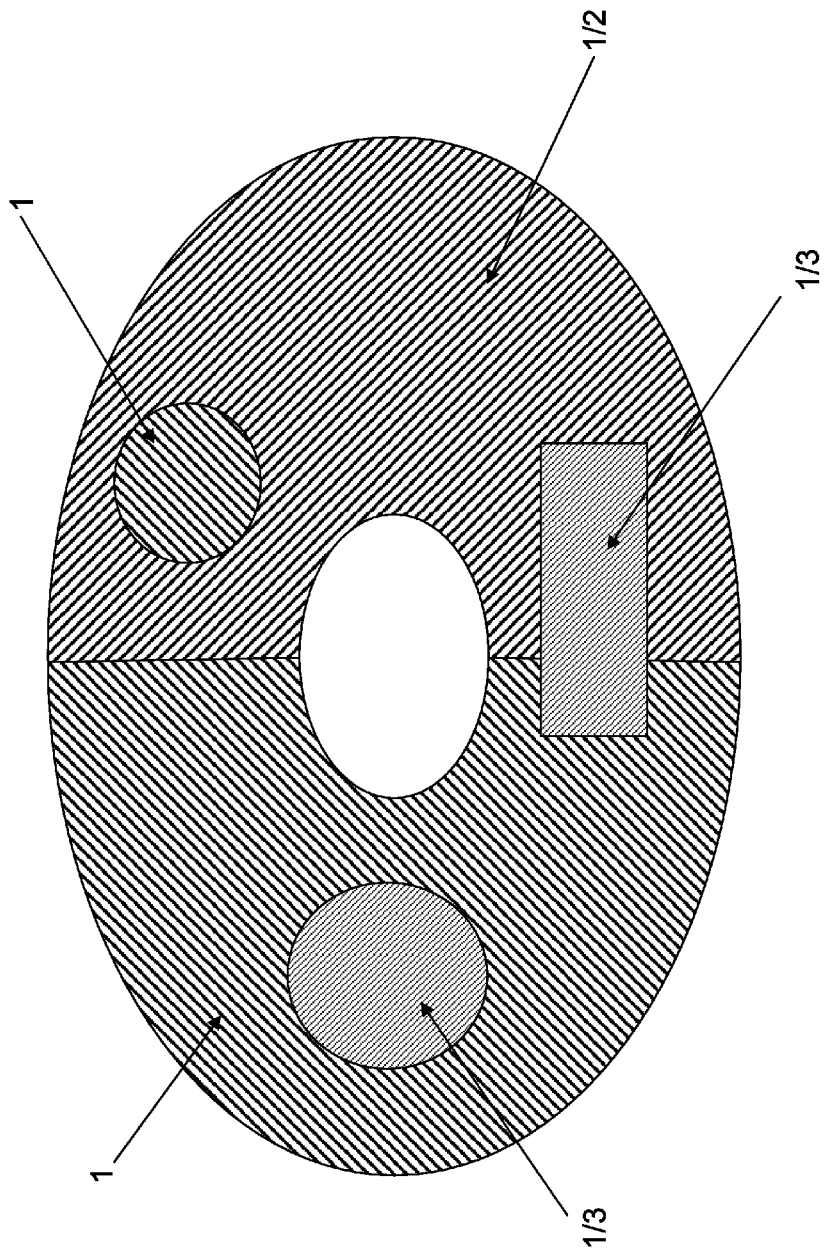
FIG. 2 illustrates values of a function f: $\mathbb{R}^n \to \mathbb{R}^+$ whose homology integral is described and calculated.

Example 2. Let $f: \mathbb{R}^n \to \mathbb{R}^+$ be 0 off an annulus and take the values as shown in FIG. 2. Then $$\mathcal{H}(f) = \int_0^1 \dim H_i(f^{-1}[t,1]) \, dt =$$

$$\int_{\frac{1}{2}}^1 \cdots + \int_{\frac{1}{3}}^{\frac{1}{2}} \cdots + \int_0^{\frac{1}{3}} = \frac{1}{2}(2,1) + \frac{1}{6}(1,3) + \frac{1}{3}(1,1) = \left(1\frac{1}{2}, 1\frac{1}{3}\right).$$

In the case where $f: \mathbb{R}^n \to \mathbb{R}^+$ is $\mathcal{C}^1$ and the support f is compact, then by Sard's Theorem the critical values of f form a closed set of measure zero, and the regular values are the union of open intervals $(t_0, t_1)$ where for $t \in (t_0, t_1)$, there is a natural diffeomorphism $f^{-1}(t) \times (t_0, t_1) \cong f^{-1}(t_0, t_1)$ and $H(f^{-1}[t,\infty))$ is constant on this interval. Thus $\int_{(t_0, t_1)} \dim H(f^{-1}[t,\infty)) \, dt = (t_1 - t_0) \cdot \dim H(f^{-1}[t,\infty))$. In particular if $\dim H(f^{-1}[t,\infty))$ is bounded on $t \in \mathbb{R}^+$ then $\mathcal{H}(f) < \infty$.

To illustrate the definition of $\mathcal{H}$ we have

Proposition 3. Let $X \subset \mathbb{R}^n$ with an $\epsilon$-tubular neighborhood approximation $X_\epsilon = \text{Nbd}_\epsilon(X)$. Let $f:[0,\epsilon] \to [0,1]$ be any weakly decreasing function with $f(0)=1$. Define $X_f: \mathbb{R}^n \to I$ by $X_f|_{X_\epsilon} = f(\text{dist}(x,X))$ and $X_f|_{\mathbb{R}^n \setminus X_\epsilon} = 0$. Then $\mathcal{H}(X) = \mathcal{H}(X_f) = \mathcal{H}(X_\epsilon)$ Proof: The sets $X_f^{-1}[t,1]$, $t \in [0,1]$, form a nested sequence of isotopic sets. Thus $t \mapsto \dim H(X_f^{-1}[t,1])$ is a constant function and $\mathcal{H}(X_f) = \int_0^1 \dim H(X_f^{-1}[t,1]) \, dt = (1-0) \cdot \dim H(X)$. ∎

In certain embodiments, the functions will have finite homology, as defined next.

Definition 4. Let f: $\mathbb{R}^n \to \mathbb{R}^+$. Let $t \in \mathbb{R}^+$. Call t a transitional value iff $\forall \epsilon > 0, \exists s_1, s_2 \in (t-\epsilon, t+\epsilon), s_1 < s_2$, so that the induced map $H(f^{-1}[s_2, \infty)) \to H(f^{-1}[s_1, \infty))$ is not an isomorphisms. Call the set of $t \in \mathbb{R}^+$ that does yield the isomorphism the persistent values of f. Say f has finite homology iff it both has a finitely many transitional values and for all $t \in \mathbb{R}^+$, $f^{-1}[t, \infty)$ has finitely generated homology. Let the transitional set and persistent set refer to the pre-image of the transitional and persistent values of f.

One advantage of using functions with finite homology is that the integral reduces to a finite sum:

Proposition 5. If f: $\mathbb{R}^n \to \mathbb{R}^+$ has finite homology and $\{t_i | 0 \leq i \leq k\}$ is its increasing sequence of transitional values then $$\mathcal{H}(f) = \sum_{i=1}^{k} (t_i - t_{i-1}) \cdot dim H(f^{-1}(t_{i-1}, \infty]) < \infty$$

Proof: By hypophysis on each index i<n for $t \in (t_{i-1}, t_i)$, $dim H_i(f^{-1}(t_{i-1}, \infty])$ has a finite constant value. The values on the transitional set $\{t_i, \ldots, t_k\}$ are also finite and the set has measure zero. The integral converges as shown.■

Sometimes it is preferred to use a finite set $\{t_0, \ldots, t_k\}$ properly including the transitional values, and the summation in the proposition will still hold.

In an embodiment below we describe an analylitc method for determining a set $\{t_0, \ldots, t_k\}$ containing the transitional values. The next comment recalls the critical set of $f|_X$ is either on $\partial X$ or where $Df=0$.

Theorem 6. Let $X \subset \mathbb{R}^n$ be a compact smooth m-manifold with boundary $\partial X$, and f: $\mathbb{R}^n \to \mathbb{R}^+$ smooth. Then the critical values of f in X and the critical values of $f|_{\partial X}$ include the transitional values of $f \cdot \chi_X$. More specifically if $dim H_i(f|_X^{-1}(t,1]) < \infty$ for all $t \in \mathbb{R}^+$, $i \leq n$ and $f(df^{-1}(0) \cap X) \cup f(d(f|_{\partial X})^{-1}(0))$ is finite then $f \cdot \chi_X$ has finite homology, and with $(t_0 < \ldots < t_k)$ the ordered sequence representing the combined critical values we have $$\mathcal{H}(f) = \sum_{i=1}^{k} (t_i - t_{i-1}) \cdot dim H(f^{-1}(t_{i-1}, \infty]) < \infty$$

As the design and coding of software for determining the critical values of f and $f|_{\partial X}$ and for evaluating homology on sets is known, this theorem provides a procedure and summation formula for determining $\chi$. The result may be extended to show piecewise polynomial functions have finite homology.

Definition 7. Let f,g: $\mathbb{R}^n \to \mathbb{R}^+$ be functions. Define $(f \vee g)(x) = \max(f(x), g(x))$ and $(f \wedge g)(x) = \min(f(x), g(x))$.

The Mayer-Vietoris sequence applies to these integrals.

Theorem 8. Let f,g,$f \vee g$,$f \wedge g$: $\mathbb{R}^n \to \mathbb{R}^+$ be functions with finite homology. Then there is the long exact sequence of Betti Numbers $\ldots \to \mathcal{H}_i(f \wedge g) \to \mathcal{H}_i(f) + \mathcal{H}_i(g) \to \mathcal{H}_i(f \vee g) \to$ $\mathcal{H}^{i-1}(f \wedge g) \to \ldots$ In some applications it is preferred to use functions taking positive and negative values. For f: $\mathbb{R}^n \to \mathbb{R}^+$, assigning $f(x)=0$ may have the effect of $x \notin Domain(f)$, the intention is particularly evident in $supp(\chi_X) = X$. For functions with values in $\mathbb{R}$ we may prefer to explicitly state the domain of f.

Definition 9. Let compact $X \subset \mathbb{R}^n$, and f:X$\to \mathbb{R}$ be given. Then $$\mathcal{H}(f) = \lim_{a \to -\infty} \left( \int_a^\infty dim H(f^{-1}[t, \infty)) dt + a \, dim H(X) \right)$$

For functions f: $\mathbb{R}^n \to \mathbb{R}$, with $Range(X) \geq 0$ and $X = f^{-1}(0, \infty)$ both definitions $\mathcal{H}(f|\mathbb{R}^+) = \mathcal{H}(f|_X)$ agree, and the limit will have stabilized for any $a \leq \min(f(X))$. In this context for $X \subset \mathbb{R}^n$, the characteristic function $\chi_X$ may be re-defined so Domain$\chi_X$=X and Range$\chi_X$=1.

Other homology concepts such as relative homology may be defined.

Definition 10. Let f,g: $\mathbb{R}^n \to \mathbb{R}^+$, $f \geq g$. Then the homology of f relative to g is defined by $$\mathcal{H}(f, g) = \int_0^\infty dim H(f^{-1}[t, \infty), g^{-1}[t, \infty)) dt$$

If $f \geq g$, then define $\mathcal{H}(f,g) = \mathcal{H}(f \vee g, g) = \mathcal{H}(f, f \wedge g)$.

In particular for sets $Y \subset X \subset \mathbb{R}^n$ and their characteristic functions, $$\mathcal{H}(X, Y) = H(X, Y) \text{ and } \mathcal{H}\left(X, \frac{1}{2}Y\right) = (H(X) + H(X, Y))/2$$

In many applications it is preferred to use relative homology in $\mathcal{H}$, and the opportunity for substitution will be implicitly known throughout this disclosure. It is sometimes preferred to use multi-valued functions as described below.

Definition 11. Let $f_i$: $\mathbb{R}^n \to \mathbb{R}^+$, $1 \leq i \leq k$. Say $\cup \{f_i | 1 \leq i \leq k\}$ has finite homology if $\forall t \in \mathbb{R}^+$, $H(\cup_{i \leq k} f_i^{-1}(t))$ is finite, and for only finitely many $t_0 \in \mathbb{R}^+$, is it true that $\forall \epsilon > 0, \exists s_1, s_2 \in (t-\epsilon, t+\epsilon), s_1 < s_2$, such that the induced map $H(\cup_{i \leq k} f_i^{-1}[s_2, \infty)) \to H(\cup_{i \leq k} f_i^{-1}[s_1, \infty))$ is not an isomorphism. Call the set of $t_0$ that do not generate the homology isomorphisms the transitional values, and the $t \in \mathbb{R}^+$ that do the persistent values, of $\cup \{f_i | 1 \leq i \leq k\}$.

With multi-valued functions we may also use the summation formula:

Theorem 12. Let $f_i$: $\mathbb{R}^n \to \mathbb{R}^+$ be given with $\cup \{f_i | 1 \leq i \leq m\}$ having finite homology. Let $(t_0 < \ldots < t_k)$ be the ordered sequence of transitional values. Then $$\mathcal{H}\left(\bigcup_{i \leq m} f_i\right) = \int_0^\infty dim H\left(\bigcup_{i \leq m} f_i^{-1}[t, \infty)\right) dt =$$

$$\sum_{i=1}^{k} (t_i - t_{i-1}) \cdot dim H\left(\bigcup_{i \leq m} f^{-1}(t_{i-1}, \infty]\right) < \infty$$

§Local Sampling and Convolution

We wish to measure the homology of a set locally in a region around each point.

Definition 13. Let $f,g:\mathbb{R}^n \to \mathbb{R}^+$. For $x \in \mathbb{R}^n$ let $g_x:\mathbb{R}^n \to \mathbb{R}^+$ be given by $g_x(y)=g(y-x)$. Then define $\langle f,g \rangle:\mathbb{R}^n \to \mathbb{R}^{+n}$ by $$\langle f, g \rangle(x) = \mathcal{H}(f \cdot g_x) = \int_0^\infty dim H(f \cdot g_x)^{-1}[t, \infty) dt$$

Also for $X,Y \subset \mathbb{R}^n$, define $\langle f,X \rangle = \langle f, \chi_X \rangle$, $\langle X,f \rangle = \langle \chi_X, f \rangle$, and $\langle X,Y \rangle = \langle \chi_X, \chi_Y \rangle$.

Naturally $\langle f,g \rangle(x) = \langle g,f \rangle(-x)$. For $B_0 = \{0\} \subset \mathbb{R}^n$, $\langle f, B_0 \rangle_0 = f$ and $\langle f, B_0 \rangle_i = 0$, $i \geq 1$. Let $B_{r,x}$ denote the ball of radius r centered at x and $B_r = B_{r,0}$. Then $\langle X, B_r \rangle$ has support $X_r = \{x | dist(x, X) \leq r\}$ with $\langle X, B_r \rangle_i(x)$ counting the number of i-cycles in $X \cap B_{r,x}$.

Figure 3:
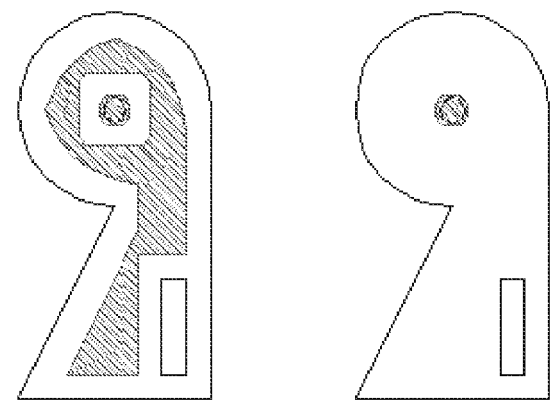
FIG. 3 shows convolutions of a function or dataset A over a function or dataset X.
Figure 3:
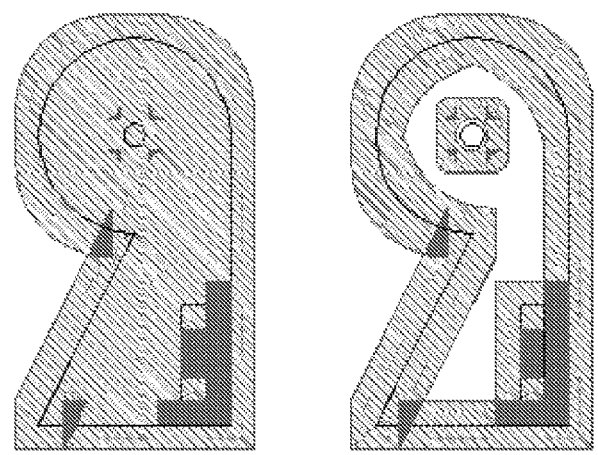
Figure 3:
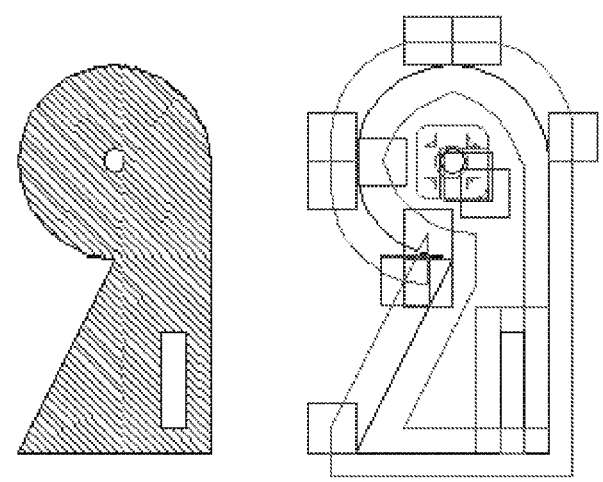

To illustrate the procedure in FIG. 3 a 1-cycle A is convolved over a set X. In the upper left hand corner X is shown and in the lower left corner some of the translations of A shown along with the envelopes where the convolution values change. The center and right upper images are $\langle X,A \rangle_0$, $\langle X,A \rangle_1$, with the white areas having value 0, the hashed areas having value 1, and the solid areas having value 2. The Euler characteristic $\chi \langle X,A \rangle$ is shown in the lower center. The relative homology (Definition 14) difference $\langle X,B \rangle_1 - \langle X,(B,A) \rangle_1$, expressing the non-triviality of $A \cap X$ in $B \cap X$, is shown in the lower right, where B is the square disk with boundary A. The lower right figure also expresses $\langle X,B \rangle_1$, but the reader may check the equality of the two expressions is a coincidence due to the coarseness of X.

Clearly other functions than the linear combinations giving the Euler characteristic or relative homology difference may be used to illuminate the geometry in X. Choosing A to reflect known expectations on X, or various functions $A_1 \ldots A_k$ and taking combinations of their results, could also enable the local topological features to be extracted. This is shown in various embodiment flow charts disclosed herein.

Figure 4:
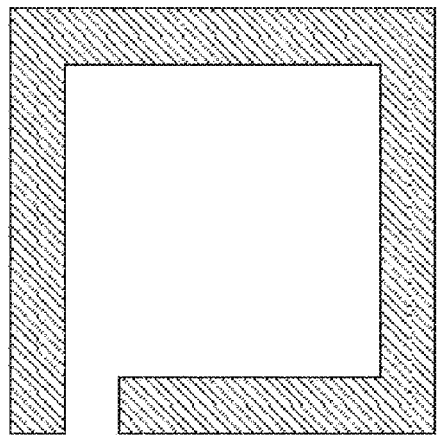
FIG. 4 shows selecting a function or dataset Y to detect structure in a function or dataset X.
Figure 4:
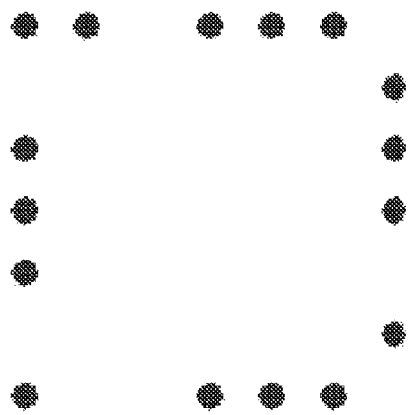
Figure 4:
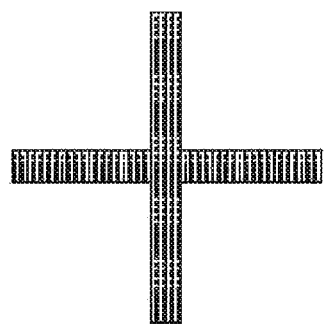

An illustration convolving with one set is given in FIG. 4, where the set X is a collection of discrete points. This set X has almost trivial topology, but appears to be arranged nearly in some orthogonal spacing. The set Y is chosen to bring out the arrangement of X. The third image in the figure is $\langle X,Y \rangle_0^{-1}[3, \infty)$ and represents the points in the plane where the center of Y may be translated to have intersections with at least three components of X.

This isolation of qualities of X applies to homology features in higher dimensions too. By choosing Y so that $X \cap Y_x$ displays the homology features of interest, $\langle X,Y \rangle_i$ may give information on the i-cycles around each x. More general functions $\langle X,f \rangle$, relative homology, and formal sums (Definition 17) of the convolution functions may also be useful. The many applications include data and image enhancement for material science and biomedicine.

In a particular embodiment the convolution may also be performed with relative homology.

Definition 14. Let $f, \tilde{f}, g, \tilde{g}: \mathbb{R}^n \to \mathbb{R}^+$ be given, with $f \geq \tilde{f}$, $g \geq \tilde{g}$. Define $$\langle (f, \tilde{f}), g \rangle(x) = \int_0^\infty dim H((f \cdot g_x)^{-1}[t, \infty), (\tilde{f} \cdot g_x)^{-1}[t, \infty)) dt$$

$$\langle f, (g, \tilde{g}) \rangle(x) = \int_0^\infty dim H((f \cdot g_x)^{-1}[t, \infty), (f \cdot \tilde{g}_x)^{-1}[t, \infty)) dt$$

For example in three dimensions with X resembling Swiss cheese and $0 \leq \epsilon \leq 1$, then $\langle X, (B_r, \epsilon B_r) \rangle_2(x)$ gives the number of bubble-holes entirely within $B_{r,x}$, plus $\epsilon$ times one less than the number of partial bubble-holes exposed on the boundary of $B_{r,x}$.

In other embodiments we may also define the interaction of f and g in the convolution by other means, such as Definition 15. Let $f,g,:\mathbb{R}^n \to \mathbb{R}^+$ be given. Define $$\Diamond f, g \Diamond(x) = \int_0^\infty dim H((f \wedge g_x)^{-1}[t, \infty)) dt = \mathcal{H}(f \wedge g_x)$$

In light of Theorem 8 this new convolution has certain advantages. Note that for $X,Y \subset \mathbb{R}^n$, with $Y_x$ denoting the translation by x, $\Diamond X,Y \Diamond(x) = H(X \cap Y_x) = \langle X,Y \rangle(x)$, and the two convolutions are in agreement, and point out the homology integral is independent from defining the homology convolution for sets. While not additive we do have for $a \in \mathbb{R}^+$, $a \langle f,g \rangle = \langle af,g \rangle = \langle f,ag \rangle$ and $a \Diamond f,g \Diamond = \Diamond af,ag \Diamond$. Other convolutions may be defined. A general notation having great flexibility uses a subscript dot to indicate which sets are being translated by the convolution and is illustrated by Example 16. Let $$\mathcal{H}((X + f_\bullet)^2 \wedge g_\bullet, Y + h_\bullet)(x) = \int_0^\infty dim H((X + f_x)^2 \wedge g_x, Y + h_x)^{-1}[t, \infty)) dt$$

It is also preferred to perform $\langle f, g_i \rangle$ for various $g_i: \mathbb{R}^n \to \mathbb{R}^+$ and then compute linear combinations of the results. For this one may define formal sums of functions.

Definition 17. Let $\alpha_i \in \mathbb{R}$, $g_i: \mathbb{R}^n \to \mathbb{R}$. We may define $G = \Sigma_{i \leq k} \alpha_i g_i$ so that $\mathcal{H}(G) = \Sigma_{i \leq k} \alpha_i \mathcal{H}(g_i)$.

The product of formal sums may be defined as the sum of the term by term products. Then $\langle f,G \rangle = \Sigma_{i \leq k} \alpha_i \langle f, g_i \rangle$. An embodiment used repeatedly in this disclosure is, for $A \subset B_r$, the formal sum $G = B_r - (B_r, A)$ which yields the function $f \mapsto \langle f,G \rangle$, where $$\langle f,G \rangle = \langle f, B_r \rangle - \langle f, (B_r, A) \rangle$$

In the case $f = \chi_X$ this reduces at $x \in \mathbb{R}^n$ to $dim H(X \cap B_{r,x}) - dim H(X \cap B_{r,x}, X \cap A_x)$, which indicates the homology of $A_x$ in $X \cap B_{r,x}$, or more precisely the localized effect of identifying $A_x$ to a point.

§Constructing Equivalences

Subsets of $\mathbb{R}^n$ may be isometric, homotopic, diffeomorphic, and compared with other equivalences. Definition 13 gives us maps $F_i = \langle X,f \rangle_i$ from $\mathbb{R}^n \to \mathbb{R}^+$ for each homology index $0 \leq i \leq n$. By using any invariant or equivalence relation on this n-tuple of maps we can construct invariants or equivalence relations on $X \subset \mathbb{R}^n$. For maps $F, \tilde{F}: \mathbb{R}^n \to \mathbb{R}^{+n}$ there are many equivalences available.

Example 18. Call $F \simeq \tilde{F}$ if (select one)
1. $\exists$ an isometry $A: \mathbb{R}^n \to \mathbb{R}^n$ such that $F = \tilde{F} \circ A$
2. $\exists$ an isometry $A: Support(F) \to Support(\tilde{F})$ such that $F = \tilde{F} \circ A$
3. $\exists$ a diffeomorphism $A: \mathbb{R}^n \to \mathbb{R}^n$ such that $F = \tilde{F} \circ A$
4. $\exists$ a diffeomorphism $A: Support(F) \to Support(\tilde{F})$ such that $F = \tilde{F} \circ A$
5. $\exists$ a diffeomorphism $A: \mathbb{R}^n \to \mathbb{R}$ such that $A(F_0^{-1}[3, \infty)) = \tilde{F}_0^{-1}[3, \infty)$
6. $\exists$ a diffeomorphism $A: \mathbb{R}^n \to \mathbb{R}$ such that for each i, $A(D(F_i)^{-1}(0)) = D(\tilde{F})^{-1}(0)$
7. $\exists$ a diffeomorphism $A: \mathbb{R}^n \to \mathbb{R}^n$ such that for each i, $A(|D^2(F_i)|^{-1}(0)) = |D^2(\tilde{F}_i)|^{-1}(0)$ 8. ∃ a diffeomorphism $A:\mathbb{R}^n \to \mathbb{R}^n$ such that for each i, $A(\Delta(F_i)^{-1}[0,\infty))=\Delta(\tilde{F}_i)^{-1}[0,\infty)$ 9. $\mathcal{H}(F_i)=\mathcal{H}(\tilde{F}_i)$ for each i.

Homeomorphisms, linear groups and types of functions other than diffeomorphism give equivalences similar to Cases 1-4. In Case 5, the projection onto the 0-coordinate could be replaced by any function $p:\mathbb{R}^n \to \mathbb{R}$. In Case 6,7 and 8, $F,\tilde{F}$ are assumed to be $C^1$ or $C^2$ so that the definitions apply. Equivalences can be defined or mixed and matched on each index value of F separately, generating a large lattice of equivalences. Invariants on these equivalence classes or others can be easily produced such as by counting features like the number of local maxima that F may have. Case 9 is not dicussed in this section but mentioned in prelude to the iterative techniques of §Iterations. Case 3 with $F=\langle X,B_r\rangle$ and other combinations are illustrated below.

Definition 19. For X and $\hat{X}$ subsets of $\mathbb{R}^n$, $X\approx\hat{X}$ will denote equivalence under ambient diffeomorphism of $\mathbb{R}^n$. For $f,\hat{f}:\mathbb{R}^n \to \mathbb{R}^+$ let $f\approx\hat{f}$ denote there exist a diffeomorphism $A:\mathbb{R}^n \to \mathbb{R}^n$ such that $f\circ A=\hat{f}$, and let $\langle X,f\rangle\approx\langle\hat{X},\hat{f}\rangle$ denote there is a diffeomorphism $A:\mathbb{R}^n \to \mathbb{R}^n$ such that $$\langle X,f\rangle_i\circ A = \langle \tilde{X},\tilde{f}\rangle_i \text{ for all } i\leq n$$

Theorem 20. For $r\in\mathbb{R}^+\cup\{\infty\}$, define $B_r=\{x\in\mathbb{R}^n|\|x\|\leq r\}$. (So $B_0=\{0\}$ and $B_\infty=\mathbb{R}^n$). Define the equivalence relation $\approx_r$ on $X,\hat{X}\subset\mathbb{R}^n$ by $$X\approx_r\tilde{X} \iff \langle X,B_r\rangle\approx\langle\tilde{X},B_r\rangle$$

Then $\approx_r$ is a "continuously indexed" family of equivalence relations that spans from ambiently diffeomorphic to homologous.

This shows how we may construct broad classes of equivalence relations. The uses for $\approx_r$ for r finite are illustrated in the following introductory example. FIG. 1 page 58 shows four 3-manifolds of genus 2 formed by attaching handles to a ball of radius R. The manifolds are intrinsically diffeomorphic and thus all homologous, $a\approx_\infty b\approx_\infty c\approx_\infty d$. Only d is distinct by ambient diffeomorphism of $\mathbb{R}^n$, so $a\approx_0 b\approx_0 c$, but $c\approx_0 d$. It can be shown that for r on a range of values near R/4, $a\approx_r b$, but there are no other related pairs, expressing the intuitive idea of bulk diffeomorphisms. It may be there is a value for r near 1.8R so that $a\approx_r b\approx_r d$, but $a\approx_r c$, expressing the independent spacing of the loops. Furthermore, by using the invariant that counts the number of local maxima of $\langle X,g_r\rangle_1$ it appears for r=2.5R that a and d each have two maxima and b and c each have one, and that for r=R that a, b, d each have two maxima while c has one, expressing the broad distances between loop regions. Also for r near the scale of the handles, $\langle X,B_r\rangle_0$ will detect the cluttering in c and d with higher values than it will for a and b. In short, the intuitive ways of describing sameness may be quantified with this methodology.

In this section we have constructed some indexed families of equivalence relations. One may choose bump functions on $g_r:B_r \to \mathbb{R}^+$ or employ other test functions similar to $g_r$ with optionally changing the support from $B_r$ to ellipsoids, tori, disconnected sets, and sets with specific shapes; in each case the n-dimensional information $\langle X,g_r\rangle$ could be tailored to give equivalence relations useful in diverse contexts. A general applications for interpreting data was shown in Example 4. By selecting from the equivalences of Example 18, by using other convolutions (including Definition 15 and Example 16), employing formal sums of sampling functions, by iterating the convolutions (§Iterations), by using lattice operations in the set of equivalences relations, and by defining more general integrals (§Morse Theory) we have a great opportunity to compare and analyze the embeddings of objects in $\mathbb{R}^n$. Many applications for isolating desired geometrical structures on $X\subset\mathbb{R}^n$ are described in §Applications for Medicine and Industry.

§Iterations

Consider $X\subset\mathbb{R}^n$ with complicated homology or even a discrete union of contractible sets. We will disclose invariants on the spatial arrangement of the homology features of X. One may choose a set $Y\subset\mathbb{R}^n$ illuminating the shape of X and evaluate $\langle X,Y\rangle$ as in FIG. 4. Alternatively we may adjust the X term of $\langle X,Y\rangle$. For $r\geq 0$ define $$X_r=\{x\in\mathbb{R}^n|\text{dist}(x,X)\leq r\} \text{ and } X_{-r}=\{x\in\mathbb{R}^n|\text{dist}(x,\mathbb{R}^n\backslash X)\geq r\}$$

Figure 5:
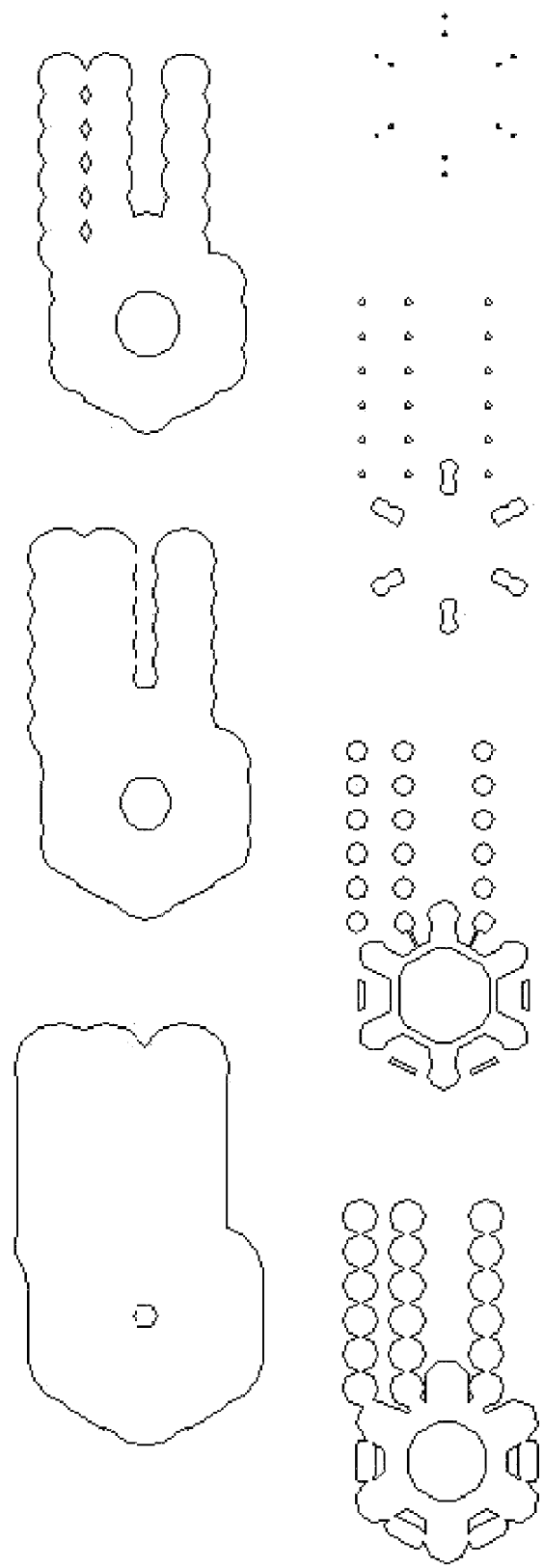
FIG. 5 shows the topology and geometric structure of a set X in various r-neighborhoods.

Note how the homology changes with respect to r. As r increases, with new tangencies $H_0(X_r)$ may decrease, while $H_1(X_r)$, $H_2(X_r)$ and any higher terms may fluctuate. FIG. 5 illustrates how the homology and spatial structure changes with the r-neighborhood.

For non-convex X, the decreasing sequence of nested sets $X_{-r}$ expresses the spatial arrangement of the non-convex features in terms of topological quantities, and the increasing sequence expresses the topology of an positional structure on the arrangement of connected components. The effect may have applications in three dimensions for material science. Choosing $f:\mathbb{R}^n \to \mathbb{R}^+$ and putting $f_s(x)=f(x/s)$, the convolutions $\{\langle X_r,f_s\rangle|r\in\mathbb{R}, s\in\mathbb{R}^+\}$ and $\{\langle X_{-r},f_s\rangle|r\in\mathbb{R}, s\in\mathbb{R}^+\}$ are doubly-indexed families of maps from $\mathbb{R}^n$ to $\mathbb{R}^n$ which may be used in interpreting X.

To obtain other multiply indexed families observe that $\langle X_r,f_s\rangle=\langle\langle X,B_r\rangle_0^{-1}[1,\infty),f_s\rangle$. It may be preferred to apply a similar iteration for functions $f_i:\mathbb{R}^n \to \mathbb{R}^+$ $$\langle\langle\langle X,f_1\rangle_{i_1},f_2\rangle_{i_2},\ldots f_m\rangle_{i_m}$$

to give more controlled interpretation of X. If each $f_i$ has scaling factor $r_i$ (or other parameter) we now get an n-dimensionally indexed family of maps from $\mathbb{R}^n$ to $\mathbb{R}^n$. Also the projection onto the $i_k$ coordinate may be replaced with other functions $\mathbb{R}^n \to \mathbb{R}^+$. This gives a multi-variable extraction of the information in X.

Another embodiment applies the iteration to simulate dynamic effects of objects. For example Crystal growth with Wulf shape $W\subset\mathbb{R}^3$ may be modeled as $\langle\ldots\langle\langle\langle X,w\rangle_0,w\rangle_0,w\rangle_0,\ldots\rangle_0$ for w a nearly infinitesimal W. Selecting w to resemble Y from FIG. 4, may also produce crystal growth effects. In another illustrative embodiment we have Example 21. Conway's Game "Life" Let $X\subset\mathbb{Z}^2$. Define $\gamma:\mathbb{Z}^2 \to \mathbb{R}^+$ by $$\gamma(0,0)=\tfrac{1}{2}, \gamma(a,b)=1 \text{ for } 0<a^2+b^2<3, \gamma(a,b)=0 \text{ for } a^2+b^2\geq 3$$

Put $X^0=X$, and $X^{n+1}=\langle X^n,\gamma\rangle_0^{-1}[2.5,3.5]$. Then $n\mapsto X^n$ is the iteration in Conway's game of Life.

Figure 6:
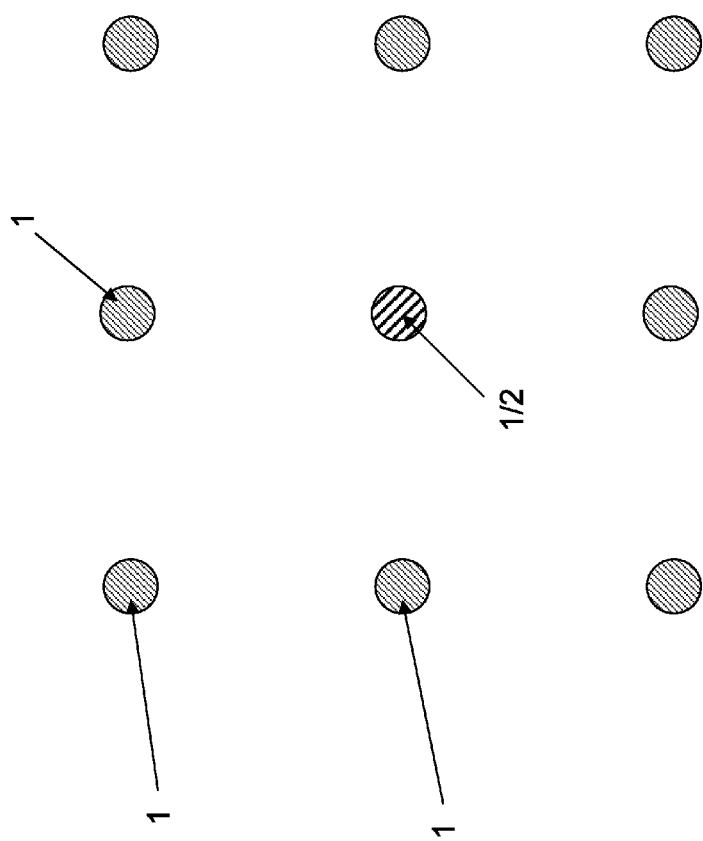
FIG. 6 shows values for γ used to produce the iteration in Conway's Game Life. $\gamma: \mathbb{Z}^2 \to \mathbb{R}^+$ by $\gamma(0,0) = \frac{1}{2}$, $\gamma(a,b) = 1$ for $0 < a^2 + b^2 < 3$, $\gamma(a,b) = 0$ for $a^2 + b^2 \geq 3$

Proof: The FIG. 6 shows the values of γ. For a point to survive its possible number of neighbors are ([2.5,3.5]−0.5)∩$\mathbb{Z}$={2,3} neighbors, and for a new point to appear possible number of neighbors are ([2.5,3.5]−0)∩$\mathbb{Z}$={3}. ∎

We may iterate as in Game of Life using higher homology information. The next embodiment was suggested by a materials problem in calculus texts.

Example 22. Sand Example

Consider a (finite) CW-complex $X\subset\mathbb{R}^3$, perhaps with spacious tiers of sculptural curvature. An idealized sand is known to form cone-shaped mounds of fixed ascent angle when poured onto a horizontal surface. Let C be the infinite solid cone with vertex the origin defined by extending one of the mounds of sand downward. Assume the surface of X is roughened in effect like the sand. In this application the problem is to determine if the sand precipitates from $\mathbb{R}^3 \setminus X$ and falls by gravity, what will the final accumulation of the sand look like on X?

The final state, with notation from Example 16, may be given by the iteration: $X^0 = X$ and $X^{n+1} \subset \mathbb{R}$ by $X^{n+1} = (\mathcal{H}((X^n \wedge C_\bullet) \vee \partial C_\bullet)_2 - \mathcal{H}((X^n \wedge C_\bullet) \vee (\partial C \setminus \{0\})_\bullet)_2 + \mathcal{H}(X^n \wedge \{0\}_\bullet)_0)^{-1}\{1,2\}$ If X is convex then the sequence stabilizes after one iteration, and in general it usually converges in a few steps. A complete discussion would require additional hypotheses on the sand's properties in compound cones.

As with crystal growth there is a state of the art approach using dynamical systems that models the granular interactions between the particles. In these examples and other application the user may use formal linear sums of convolutions and other non-linear combinations to more rapidly find steady states or other solutions for dynamical system problems. For instance, a formal sum of convolutions analogous to the example above may be used to express droplet formation on X under cohesive and adhesive forces, or drug targeting in micro-biology.

There are many applications for these iterations, as shown in the data extraction examples, the evolution properties in the Conway example, and the direct solution in the sand example.

§Morse Theory and Other Integrals

Figure 8:
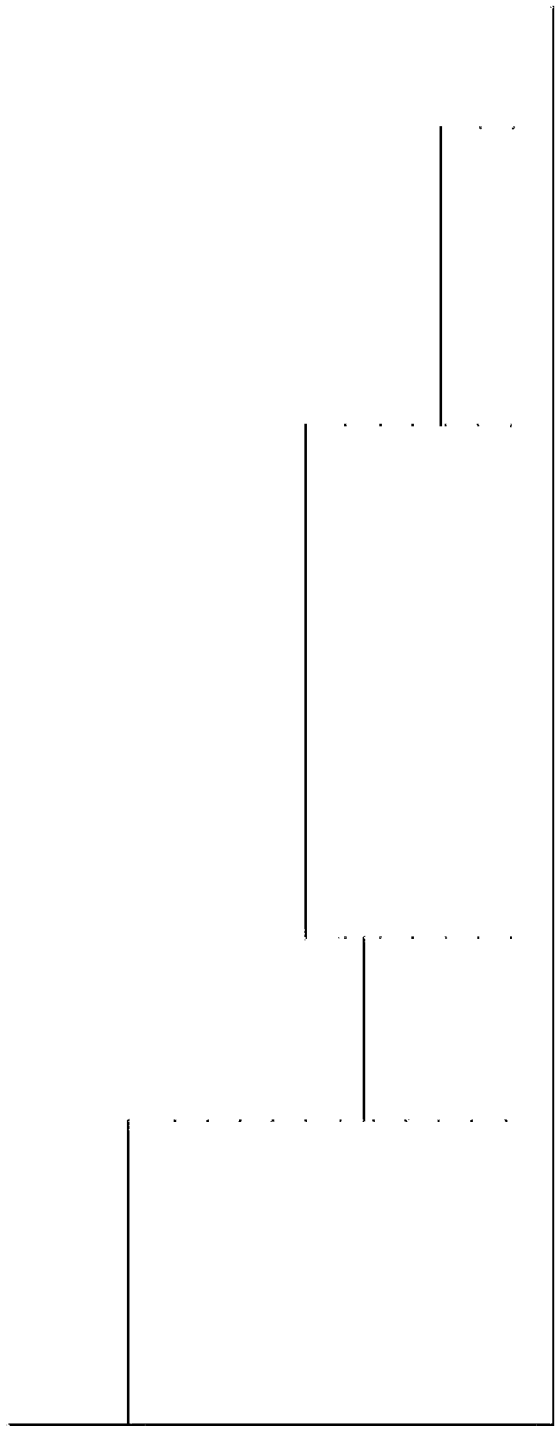
FIG. 8 illustrates a step function h(t) for the purposes of comparing the homology integration to Morse Theory.

Let $X \subset \mathbb{R}^n$ be a smooth manifold and $f: \mathbb{R}^n \to \mathbb{R}^+$ a Morse function for X. There is an overlap in calculating $\mathcal{H}(f \cdot X)$ and using Morse Theory to determine H(X). FIG. 8 will illustrate the case where f·X has critical points $(t_1, t_2, t_3, t_4)$ and the minimum and maximum values of f are given by respectively $t_0 = 0$ and $t_5$, and these are not achieved on X. In the figure $h(t) = \dim H((f \cdot X)^{-1}[t, \infty))$, so $h(t_0) = \dim H(X)$ and $h(t_5) = (0, \ldots, 0)$. The step function in the picture symbolically indicates the Betti numbers in a given dimension. To see the comparison, the incremental construction of X in Morse Theory is done downward from $\infty$ to 0.

With Morse Theory one essentially does the integration $$dim H(X) = h(t_0) = h(t_5) - \int_{t_0}^{t_5} h'(t) dt = \int_{t_5}^{t_0} h'(t) dt$$

As h is a step function, h' is zero away from $(t_1, t_2, t_3, t_4)$, and must be interpreted as the test functions at the singular points. The calculation for $\mathcal{H}(f \cdot X)$ employs the same simple approach, but one integrates to get the area under the curve. We have $$\mathcal{H}(f \cdot X) = \int_{t_0}^{t_5} h(t) dt$$

Using integration by parts we also have $$\int_{t_5}^{t_0} t \cdot h'(t) dt = t \cdot h(t) \Big|_{t_5}^{t_0} - \int_{t_5}^{t_0} h(t) dt = \int_{t_0}^{t_5} h(t) dt = \mathcal{H}(f \cdot X)$$

To emphasize the comparison, the test function h' may be re-formulated as $$g(t) = \lim_{\epsilon \to 0} \int_{t+\epsilon}^{t-\epsilon} h'(t) dt = \lim_{\epsilon \to 0} ((h(t-\epsilon) - h(t+\epsilon))$$

One gets for Morse Theory $$dim H(X) = \int_{t_5}^{t_0} h'(t) dt = \sum_{i=1}^{4} g(t_i)$$

and for the homology integral $$\mathcal{H}(X \cdot f) = \int_{t_5}^{t_0} t \cdot h'(t) dt = \sum_{i=1}^{4} t_i \cdot g(t_i)$$

Both equations can be seen directly, the Morse Theory summation as a telescoping sum $$dim H(X) = h(t_0 + \epsilon) - h(t_4 + \epsilon) =$$
$$\sum_{i=1}^{4} h(t_{i-1} + \epsilon) - h(t_i + \epsilon) = \sum_{i=1}^{4} h(t_i - \epsilon) - h(t_i + \epsilon) = \sum_{i=1}^{4} g(t_i)$$

As $h(t_i + \epsilon)$ may be used to represent the constant value of h(t), for $t_i < t < t_{i+1}$ the homology integral $\mathcal{H}$ is seen simply through the step function as $$\int_{t_0}^{t_5} h(t) dt =$$
$$\sum_{i=0}^{4} (t_{i+1} - t_i) h(t_i + \epsilon) = \sum_{i=0}^{4} t_{i+1} h(t_{i+1} - \epsilon) - \sum_{i=0}^{4} t_i h(t_i + \epsilon) = \sum_{i=1}^{4} t_i \cdot g(t_i)$$

The function $g(t) = \lim_{\epsilon \to 0}((h(t-\epsilon) - h(t+\epsilon))$ is the limiting differences in the homologies of the half-line preimages $f^{-1}[t-\epsilon, \infty)$ and $f^{-1}[t+\epsilon, \infty)$. Up to Euler Characteristic, the limiting difference may also be expressed locally at t using relative homology as $$\hat{h}(t) = \lim_{\epsilon \to 0} dim H(f^{-1}[t, t+\epsilon), f^{-1}(t, t+\epsilon])$$

To do this we may choose $\epsilon$ smaller than the inter-spacing between the singular values so the limits are stabilized. By homotopy and excision we have $$\hat{h}(t) = dim H(f^{-1}[t-\epsilon, t+\epsilon), f^{-1}(t, t+\epsilon]) = dim H(f^{-1}[t-\epsilon, \infty), f^{-1}[t+\epsilon, \infty))$$

From the relative homology long exact sequence of Betti numbers on $H_i(f^{-1}[t-\epsilon, \infty), f^{-1}[t+\epsilon, \infty))$ this gives $$\to h_i(t+\epsilon) \to h_i(t-\epsilon) \to \hat{h}(t) \to h_{i-1}(t+\epsilon) \to$$

The Euler Characteristic equation on this exact sequence gives $$\chi(\hat{h}(t)) = \chi(h(t-\epsilon)) - \chi(h(t+\epsilon)) = \chi(g(t))$$

So in terms of $\hat{g}(t)$, the relative homology at t, one gets for Morse Theory $$\chi H(X) = \chi \sum_{i=1}^{4} g(t_i) = \sum_{i=1}^{4} \chi \hat{h}(t)(t_i)$$

and for the homology integral $\mathcal{H}$ $$\chi\mathcal{H}(X\cdot f) = \chi\sum_{i=1}^{4} t\cdot g(t_i) = \sum_{i=1}^{4} t\cdot \chi\hat{h}(t_i)$$

These comparisons of Morse Theory as $\int h'$ and $\mathcal{H}$ as $\int h$ or $\int th'$ illustrate how in some embodiments higher order integrals and the insertion of kernels such as $$\int_0^\infty K(t)\, dimH(f^{-1}[t,\infty))\,dt$$

may be used to give variations on $\mathcal{H}$. For instance we may soften the transition from t to (t,t+ϵ] as in $$\int_0^\infty \int_0^\infty K(s)\, dimH\left(f^{-1}([t,\infty),[t+s,\infty))\right)ds\,dt \Big/ \int_0^\infty K(s)\,ds$$

where K(s) may be as simple as $\chi_{[0,1]}$. One may also choose $f:\mathbb{R}^n \to \mathbb{R}^2$ (or higher m>2) and evaluate $$\int_0^\infty \int_0^\infty dimH(f^{-1}([s,\infty)\times[t,\infty)))ds\,dt$$

and other variations.

§Convolution Bundles

In the next embodiment we expand the convolutions $\langle f,g\rangle$ and $\langle\!\langle f,g\rangle\!\rangle$, from operating on functions $f,g:\mathbb{R}^n \to \mathbb{R}^+$ to operating on families of these functions. Let G be a collection of maps $g:\mathbb{R}^n \to \mathbb{R}^+$. Define $\langle f,G\rangle:\mathbb{R}^n\times G \to \mathbb{R}^n$ by $$\langle f,G\rangle_i(x,g) = \langle f,g\rangle_i(x)$$

So each point x has a family of convolution values indexed by G. From here we may wish to take the infimum or supremum over G at each point $x\in\mathbb{R}^n$, integrate over G at each point $x\in\mathbb{R}^n$, consider the total bundle with fiber G, or take other advantage of the structure of G.

Figure 7:
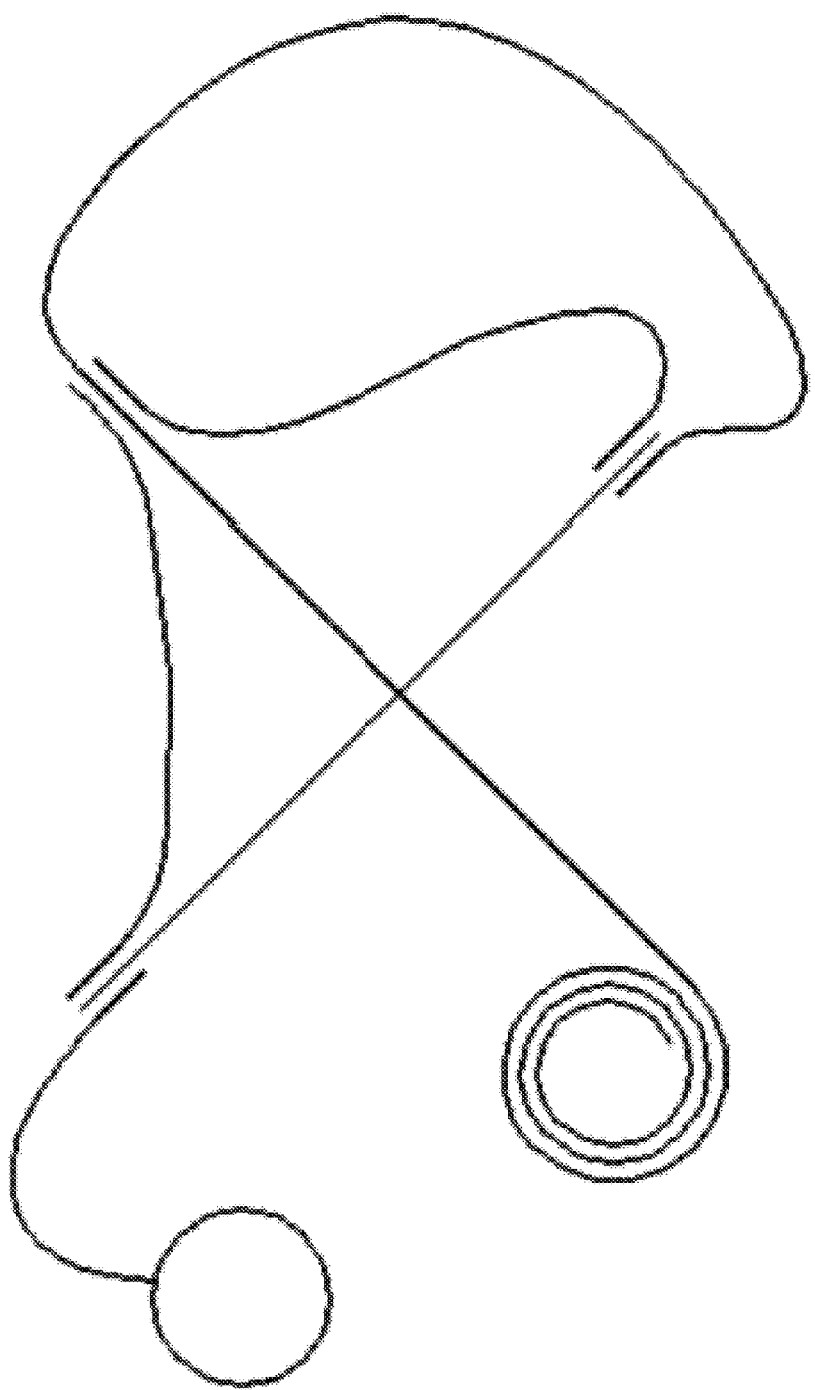
FIG. 7 illustrates approximate tangency relationships for a strand-like material.

Consider several spliced ropes arranged in three-space. For simplicity neglect the braiding or twisting in the manufacture of the ropes, and notice the graph diagram on how the strands from the ropes are interlaced into each other. FIG. 7 suggests some of the features for consideration for the clustered strand patterns.

One approach to saying when two clustered ropes X and Y in three-space are equivalent illustrates the idea of the convolution bundle. The method applies to comparing polymer chains and other applications. An estimate is first taken to formalize how close the ropes need to be to constitute tangency. The rope thickness, tangency spacing, and larger feature scales are preferable separated by orders of magnitude. Let D be a disk of diameter 10 times the tangency spacing. Let G be the collection of all rotations of D centered at the origin, so G is indexed by the projective plane $\mathbb{P}^2$. Thus $\langle X,G\rangle_0$ gives a value for the elements of the bundle η having base space $\mathbb{R}^3$ and fiber $\mathbb{P}^2$.

Example 23. Say X is equivalent to Y if there is a bundle map $A:\eta\to\eta$ such that for all $x\in\mathbb{R}^3$ and $\rho\in\mathbb{P}^2$, $$\langle X,G\rangle_0(x,\rho) = \langle Y,G\rangle_0(A(x,\rho))$$

The disk D detects the number of strands that cross it, taking higher values when the disk is transverse to the rope clusters, but D should be small enough to miss the broader distances between the strands. The importance here is that the bundle map enables the disk to rotate between rope clusters, so that the topology of the configuration is only noticed.

For greater precision the convolution may be modified by replacing the disk with a solid cylinder C with ends D', D". Put Z to equal the formal sum (C,D'∪D")−(C,D')−(C,D") so that $\langle X,Z\rangle_1$ counts only the strands in C that reach from D' to D". Now $G=(\rho(Z)|\rho\in\mathbb{P}^2)$ is all rotations of the relative sets centered at the origin. Then we may define X and Y to be equivalent if there is a bundle map $A:\eta\to\eta$ satisfying $\langle X,G\rangle_1(x,\rho) = \langle Y,G\rangle_1(A(x,\rho))$. The height of the cylinder C reduces the effect the curvature had on D. Of course other functions beside the characteristic functions given, or linear or non-linear formal combinations of them may be used to further tailor the equivalence relation to a specific task. Other examples would also illustrate the point that the bundle map allows the convolution to rotate with X further improving the convolutions sensitivity to isolate the crucial structure.

More generally this example extends including the case where X is a higher dimensional CW-complex with additional structure and G is any collection of sets. Then X and Y are equivalent if there is a bundle map on $\mathbb{R}^n\times G$ showing an equivalence on $\langle X,G\rangle$ and $\langle Y,G\rangle$.

Example 24. Suppose $X\subset\mathbb{R}^3$ resembles a 1-skeleton web or net.

This is a frequent problem of determining a surface from edge data in a computer model. The web may be multi-sheeted and/or thickened such as an ϵ-neighborhood of a 1-skeleton. The idea is that X can be extended to a 2-complex forming the sheets of the web. Our goal is to find the best fitted 2-complex.

Preferably the strand diameter of the web, the diameter of the holes in the web, and the inter-spacing between the sheets of the web are separated by orders of magnitude. Let c denote the average diameter of the suggested 2-cells on the web. Define $g:\mathbb{R}^3\to\mathbb{R}$, where $r=\sqrt{(x_1^2+x_2^2)}$, for r<2c and $|x_3|<c/10$, by $$g(x_1,x_2,x_3) = \left(1-\frac{r}{2c}\right)\left(1-\frac{10|x_3|}{c}\right)$$

and g is zero elsewhere. The support of g is a disk of radius 2c and thickness c/5, with values tapering to 0 at the boundaries. Let $G=\{g\circ\rho|\rho\in\mathbb{P}^2\}$. Then $$F=\int_G \langle X,G\rangle_1(x,g)dg$$

measures the occurrence of disks $g_\rho$ centered at x weighted according to their production of 1-cycles in $g_{\rho,x}\cap X$.

This function $F:\mathbb{R}^3\to\mathbb{R}^+$ takes non-zero values on the desired 2-complex of the web, dissipating to zero off a neighborhood of the 2-complex. In some cases where the web sheets cross through each other or have sheets in very close proximity, it may be necessary to define a linear or other combination on the indexed convolution functions, to eliminate false 2-cells in the region where the web-sheets are in close proximity. To do this we may count only the 1-cycles in $g_{\rho,x}\cap X$ that encircle the disk's axis, by defining $\hat{g}(x_1, x_2,x_3) = g(x_1,x_2,x_3)$ when $x_1$ and $x_2$ are not both zero, and $\hat{g}(0,0,x_3)=0$. So $\mathcal{H}(\hat{g})_1=1$. As before $\hat{G}=\{\hat{g}\circ\rho|\rho\in\mathbb{P}^2\}$. Then $$\int_{\hat{G}} 1 - \mathcal{H}(\hat{g}_\bullet,\hat{g}_\bullet\wedge X)_1 d\hat{g}:\mathbb{R}^3\to\mathbb{R}^+$$

measures only the $g_{\rho,x}$ disks containing a 1-cycle of X that encircles the disk axis.

Alternatively to find the 2-complex of the web we may consider the configuration space of a ball $B_r$ in $\mathbb{R}^3 \backslash X$, given by $\langle X, B_r \rangle_0^{-1}(0)$. The first method though may be preferred as it has far greater capacity for resolving very close sheets, can be tuned very precisely, and generalizes to finding k-complexes substantiated by j-complexes in $\mathbb{R}^n$.

The next embodiments give several applications of the convolution to studying a porous material, and adapts to composites and micro-structures that are distributed somewhat uniformly throughout a material. In particular, bone and other body tissues may be given numerical quantities much more informative than traditional density.

Example 25. Let X be a sponge or bone-like material.

In preferred embodiments microscopically small samples of the material X may have high genus. We will show how several quantities may be tabulated related to the distribution, elongation, and frequency of the short non-trivial cycles in X. Let $D_r$ be a disk through the origin of radius r. Define $G_r = \{\rho(D_r) | \rho \in \mathbb{P}^2\}$. Here $\rho$ is identified with the line normal to the disk $\rho(D_r)$. Then $$\int_{\mathbb{P}^2} \langle X, G_r \rangle_0(x, \rho) d\rho / (\text{Area}(D_r) \cdot \text{Area}(\mathbb{P}^2))$$

gives a measurement of strand density at x. In another embodiment, instead of integrating at each $x \in \mathbb{R}^3$, the $\rho \in \mathbb{P}^2$ that give the maximum value on $\langle X, G_r \rangle_0(x, \rho)$ may be determined to give a near foliation showing the predominant strand direction, a material property that would be useful to name in applications.

The frequency of the one-cycles in X locally in the ball $B_{r,x}$ may be counted as $\langle X, B_r \rangle_1(x) / \text{Volume}(B_r)$ or $\langle X, (B_r, \partial B_r) \rangle_1(x) / \text{Volume}(B_r)$. These quantities contribute to the genus density, but deal with the boundary effect of the core sample $B_r$ differently. For X spanning $\mathbb{R}^3$ and evenly distributing its topological features in some probabilistic manner, one can show $$\lim_{r \to \infty} \langle X, B_r \rangle_1 / \text{Volume}(B_r) = \lim_{r \to \infty} \langle X, (B_r, \partial B_r) \rangle_1 / \text{Volume}(B_r)$$

which legitimates calling the quantity the genus density of X.

To detect the directional elongation in X, we may also work in $B_r$ on the one-cycles. Define $f: B_r \to [0, 2r]$ by $f(x_1, x_2, x_3) = x_3 + r$. Off $B_r$ f can be given the value 0. Other supports and functions could be used. Let $x \in \mathbb{R}^3$ be given. Consider the function from $SO(\mathbb{R}^3) \to \mathbb{R}^+$ defined by $$\rho \mapsto \langle X, f \circ \rho \rangle_1(x)$$

The $\rho$ values that make the upper level sets of $f \circ \rho$ generally parallel to the greatest number of cycles in $B_r$ will return the highest values in the convolution. It is valuable to compare this measurement of directional elongation using f and one-cycles to the elongation indicated by the dominant strand direction using the disk $D_r$ and zero-cycles.

We may also determine another valuable characterization of the morphology orientation by evaluating which $f: B_r \to [0, 1]$, with $f^{-1}[t, 1]$ convex for all $t \leq 1$, and normalizing condition $\int_{B_r} f = \text{Volume}(B_r)/2$ give maximal values in $\langle X, f \rangle_1(x)$ when averaged on x over a local region of $\mathbb{R}^3$. The shape of $f^{-1}[t, 1]$ represents information on the average 1-cycle of X with parameter t.

§Plane Slicing and a Partial Closure Operator

For another application of the convolution bundle, we will take the supremum over the fiber and produce an iteration that yields a closure operator somewhat like convexity. This has many applications including smoothing data, similar to taking the convex-hull, but with customizable curvature and homology characteristics. First we remark on some ordinary aspects of convexity.

Definition 26. Write $G^k$ to denote the set of homogeneous k-planes in $\mathbb{R}^n$, and $E^k$ to denote the set of closed half k-planes with bounding (k−1)-plane in $G^{k-1}$.

Theorem 27. $\forall$ compact $X \in \mathbb{R}^n$,
1. $\forall 1 \leq k \leq n$,
   X is convex $\iff$ Range$(\langle X, G^k \rangle) = \{(0, 0, \ldots, 0), (1, 0, \ldots, 0)\}$
2. $\forall 1 \leq k \leq n$,
   X is convex $\iff$ Range$(\langle X, E^k \rangle) = \{(0, 0, \ldots, 0), (1, 0, \ldots, 0)\}$ For $x \in \mathbb{R}^n$, $g \in G^k$, the value $\langle X, E^k \rangle(x, g)$ may give detailed information, such as the slice containing multiple components, non-trivial 1-cycles, etc., on how X may fail to be convex.

For alternative numerical information the quantity $\int_{E^k} \langle X, g \rangle dg / \int_{E^k} dg$ gives at point x the average homology of the intersection of the half-spaces with X. For convex X, the average is $(1, 0, \ldots, 0)$ in the interior of X, at most $(1/2, 0, \ldots, 0)$ on the boundary, and decreases with the view of X as x is moved further from X.

Or one may ask for which $g \in G^k$ does the r.h.s. of claim 1 above hold. The set $\{g \in G^1 | \forall x \in \mathbb{R}^n, \text{Range}\langle X, g \rangle \in \{(0, 0, \ldots, 0), (1, 0, \ldots, 0)\}\}$ gives the directions in which X is convex. In particular if X is convex in all directions then X is convex, and if X and Y are convex in direction g then $X \cap Y$ is convex in direction g. A directional convexhull is easily defined. The integer level sets and their boundaries in $\langle X, E^k \rangle_i$ and $\langle \mathbb{R}^n \backslash X, E^k \rangle_i$ give other information.

By generalizing the intersections above from linear subspaces to more general sets, we may choose a closure operator that utilizes the convolution bundle effectively. Note: We will usually be using the dual sense of closure operator, so have reversed the inclusion in 1 below.

Definition 28. Let $X \mapsto \hat{X}$ be a function that maps from subsets of $\mathbb{R}^n$ to subsets of $\mathbb{R}^n$. If
1. $X \supset \hat{X}$
2. $\hat{\hat{X}} = \hat{X}$
3. $X \subset Y \Rightarrow \hat{X} \subset \hat{Y}$ Then call $X \mapsto \hat{X}$ a closure operator. If $X \mapsto \hat{X}$ satisfies 1 and 2 then call it a partial closure operator. If $X \mapsto \hat{X}$ satisfies 2, 3 and $X \subset \hat{X}$ then call it an upward closure operator.

Proposition 29. Let be a collection of sets in $\mathbb{R}^n$. For $X \subset \mathbb{R}^n$, define $$\hat{X} = \{x \in X | \exists Z \in \text{ with } x \in Z \subset X\}$$

Then $X \mapsto \hat{X}$ is a closure operator

Proof: From the definition $\hat{X} = \cup \{Z \in | Z \subset X\}$. Thus $\hat{X} \subset X$, $\hat{\hat{X}} = \hat{X}$, and $X \subset Y \Rightarrow \hat{X} \subset \hat{Y}$. ∎

One can show the proposition generalizes the convexhull, although complementation is reversed. The convexhull of $X \subset \mathbb{R}^n$ will be denoted cvh(X).

Proposition 30. let $= \{P_x | x \in \mathbb{R}^n, P \in E^k\}$. Then as defined above, $X \mapsto \hat{X}$ is a closure operator. Moreover for k=n and X compact or open, $\hat{X} = \mathbb{R}^n \backslash \text{cvh}(\mathbb{R}^n \backslash X)$.

Proof: That this is a closure operator was shown in Proposition 29. The agreement with the convexhull is standard. ∎

With terminology dual by set complementation to convention, we have

Definition 31. Let $f \mapsto \hat{f}$ be a function that maps from $f: \mathbb{R}^n \to \mathbb{R}^+$ to $\hat{f}: \mathbb{R}^n \to \mathbb{R}^+$. If
1. $f \geq \hat{f}$
2. $\hat{\hat{f}} = \hat{f}$
3. $f \leq g \Rightarrow \hat{f} \leq \hat{g}$ Then call $f \mapsto \hat{f}$ a closure operator on functions from $\mathbb{R}^n \to \mathbb{R}^+$. If $f \mapsto \hat{f}$ satisfies 1 and 2 then call it a partial closure operator on functions from $\mathbb{R}^n \to \mathbb{R}^+$. If $f \mapsto \hat{f}$ satisfies 2,3 and $f \leq \hat{f}$ then call it an upward closure operator.

Proposition 32. Let be a collection of sets in $\mathbb{R}^n$. For $f: \mathbb{R}^n \to \mathbb{R}^+$ define $$\hat{f}(x) = \sup\{t \in \mathbb{R} | \exists Y \in \text{ with } x \in Y \text{ s.t. } \forall y \in Y, f(y) \geq t\}$$

Then $\hat{f}$ is a closure operator on functions $: \mathbb{R}^n \to \mathbb{R}^+$ By using characteristic functions in this proposition it may be seen to generalize Proposition 29. Under the given formulation the propositions relate as $$(\hat{f})^{-1}(t, \infty) \subset \widehat{f^{-1}(t, \infty)} \subset \widehat{f^{-1}[t, \infty)} \subset (\hat{f})^{-1}[t, \infty),$$

but without additional conditions on f and the inclusions may all be strict.

Given below is an example applying Propositions 29 and 32. Here $X \subset \mathbb{R}^3$ has a large fundamental group, but many bumps, surface irregularities and culde-sacs. Our goal is to find a smoother set $\hat{X}$ eliminating the narrow irregular pathways.

Example 33. Let be he collection of all embeddings $s: S^1 \to \mathbb{R}^n$ that satisfy
1. s contains the origin
2. s is smooth
3. The length $l(s)$ is less or equal to $10\pi$
4. The local curvature $c(s(t)) \leq 2 \; \forall t \in S^1$
5. The total curvature $\int c(s(t))dt$ lies within $[2\pi, 3.1\pi]$
Then for all $X \subset \mathbb{R}^n$ define $\hat{X}$ by $$\hat{X} = \{x \in \mathbb{R}^n | \exists s \in \text{ with } \langle X, s \rangle_1(x) = 1\}$$

and for all $f: \mathbb{R}^n \to \mathbb{R}^+$ define $$\hat{f}(x) = \sup \langle f, \rangle_1(x)$$

Then $X \mapsto \hat{X}$ and $f \mapsto \hat{f}$ are closure operators.

Conditions 2, 3 4 and 5 in the example could be varied or eliminated and other translationally invariant conditions inserted. They control how $\hat{X}$ is carved from X by giving conditions specific to the problem on the envelope defining $\partial \hat{X}$. Various effects may be produced by considering piecewise linear cycles with at most n singularities, by varying the numerical bounds in the example, and by adding additional constraints. By specifying the conditions one may trim the set X to variously find the cyclic channels of interest.

Definition 34. Let be a collection of subsets of $\mathbb{R}^n$. Say is extended on zero if $\forall Z \in$,
1. $0 \in Z$
2. $\forall x \in Z, Z_{-x} \in$.
These two conditions are equivalent to the one condition $$\forall x \in \mathbb{R}^n, \forall Z \in, 0 \in Z_x \Longleftrightarrow Z_x \in.$$

Also if is a collection of pairs of subsets of $\mathbb{R}^n$, Say is extended on zero if $\forall x \in \mathbb{R}^n, \forall (X,Y) \in, 0 \in X_x \Longleftrightarrow (X_x, Y_x) \in$.

Proposition 35. Let be a collection of pairs $(Y,Z)$ with $Y, Z \subset \mathbb{R}^n$. Assume is extended on zero. Let $K: \to \text{Powerset}(\mathbb{Z}^n)$ satisfy $(Y_x, Z_x), (Y,Z) \in \Longrightarrow K(Y_x, Z_x) = K(Y,Z)$. Then for $X \subset \mathbb{R}^n$, $$\hat{X} = \bigcup_{(Y,Z) \in} X \cap \langle X, (Y,Z) \rangle^{-1} K(Y,Z)$$

is a partial closure operator.

There are many ways to use this; some embodiments set to be all embeddings of the unit ball containing the origin, with the empty set for the relative set, and choosing bounds of interest for the homology, $\hat{X}$ will give the points of X contained in a ball, with the ball intersect X having the desired homology. To illustrate relative homology, let $\hat{X}$ be a fibrous material similar to a cotton ball, and taking a small ball with its bounding sphere for the relative set, the partial closure operator above with bounds on first homology would pick out those regions with a specified range on the number of fibers passing through the ball. In application for membranes, tissues, polymer composites, etc., this extends the idea of looking for density or composition ranges to being able to define the local topological ranges of the material. Additional requirements on $(X \cap Y_x, X \cap Z_x)$ such as curvature, volume, or composition density can be incorporated with the topological ranges as was done in Example 33.

Proposition 35 for certain subsets of $\mathbb{R}^n$ can be strengthened to give a closure operator, by reverting to Proposition 29.

Definition 36. Let CW-complexes $X, Y \subset \mathbb{R}^n$ be given. Say X is efficient iff $\forall X' \subset X, \mathcal{H}(X) = (X')_- X = X'$. Say $(X,Y)$ is efficient iff $\forall X' \subset X, \mathcal{H}(X,Y) = \mathcal{H}(X',Y)_- X = X'$.

Evidently a closed manifold X in $\mathbb{R}^n$ is efficient as are certain other CW-complexes.

Proposition 37. Let Z be an efficient CW-complex in $\mathbb{R}^n$. Let be a collection of piecewise-smooth embeddings of Z extended on zero. Define $K = \chi_{dimH(Z)}: \mathbb{R}^{n+1} \to \{0,1\}$, so $K(i_0, \ldots i_n) = 1 \Longleftrightarrow (i_0, \ldots i_n) = dimH(Z)$. For $Y \subset \mathbb{R}^n$ define $\hat{Y}$ by $$\hat{Y} = \{x \in \mathbb{R}^n | \exists Z' \in, K(\langle Y, Z' \rangle(x)) = 1\}$$

Then $Y \mapsto \hat{Y}$ is a closure operator.

The proposition is a special case of Propositions 29 and 35. The set in Example 33 implicitly satisfies the hypothesis, and so the proposition proves the examples claims. The set may be selected using any applicable condition on the embeddings, for instance as was done in the example with curvature and lengths. The proposition extends from $X \mapsto \hat{X}$ to $f \mapsto \hat{f}$.

Proposition 38. Let $Z,,K$ satisfy the hypothesis of Proposition 37 above. Define $$\hat{f}(x) = \sup\left\{t \in \mathbb{R}^n \;\middle|\; \exists Z' \in \mathcal{Z} \text{ with } K\left\{\frac{1}{t}f, Z'\right\}(x) = 1\right\}$$

Then $f \mapsto \hat{f}$ is a closure operator.

If is a collection of efficient pairs extended on zero, Propositions 37 and 38 apply for relative homology with the same proof. The next proposition shows a sum of convolutions yielding a partial closure operator. The idea is to find only those $X_x$ that are non-trivial in $Y_x \cap W$.

Proposition 39. Let $X, Y \subset \mathbb{R}^n$ with $X \subset Y$. Let be a collection of embeddings $(X',Y')$ extended over zero. These embeddings commute with the inclusions. For $W \subset \mathbb{R}^n$, define $$\hat{W} = \{x \in \mathbb{R}^n | \exists (X',Y') \in, X'_x \subset W, \text{ s.t. }$$
$$\langle W,Y' \rangle(x) - \langle W_x(Y',X') \rangle(x) = \mathcal{H}(X')\}$$

Then $W \mapsto \hat{W}$ is a partial closure operator.

The example below reiterates the value of considering cycles that appear nontrivial in chosen local neighborhoods.

Example 40. Let S be the collection of smooth 1-cycles contained in $B_r \subset \mathbb{R}^n$, passing through the origin, and of length $\leq 2\pi r$. Put $= \{(s,B_r) | s \in S\}$. For $W \subset \mathbb{R}^n$ define $$\hat{W} = \{x \in \mathbb{R}^n | \exists (s,B_r) \in, s \subset W, \text{ s.t. } \langle W,B_r \rangle_1(x) -$$
$$\langle W,(B_r,s) \rangle_1(x) = 1\}$$

This partial closure operator constructs $\hat{W}$ as the set of all points in W containing a cycle s of length $< 2\pi r$, where s appears non-trivial in some $B_r \cap W$ containing s. For $r=0$ the $\hat{W}_r$ is empty and as $r \to \infty$, $\hat{W}_r$ becomes the non-simply connected components of W. For example showing how intuitive the method is, when tying a rope swing to a tree, despite that $\mathbb{R}^3 \setminus \{\text{tree}\}$ is simply connected, one naturally looks for a branch . x with $\mathcal{H}(B_{r,x} \cap \mathbb{R}^3 \setminus \{\text{tree}\}) = 1$ or more.

Other combinations of convolutions may yield partial closure operators. The sand accumulation in Example 22 gives an iteration, defined as a sum of several convolutions, that if it does converge as believed in finitely many steps, would produce an upward closure operator, the sand-hull. Other iterations in §Iterations and color ideas of the next section may yield more elaborate closure operators, and the closure operators give additional means for choosing the equivalence relations of §Constructing Equivalences.

The claim 3 above may be compared to the closure operator of Proposition 30 to show convexity is a specific case of Proposition 29. Also $\tilde{E}^n$ may be used for the closure operator on functions in Proposition 32.

Definition 41. Let $X \subset \mathbb{R}^n$, $r \in (0, \infty)$. Say X is r-convex iff $$\text{Range}(\chi_{X, B_r}) = \{(0, \ldots, 0), (1, 0, \ldots, 0)\}$$

and define the r-hull of X by $$r\text{-hull}(X) = \cap \{Y \subset \mathbb{R}^n | X \subset Y \text{ and } Y \text{ is } r\text{-convex}\}$$

If $X \subset \mathbb{R}^n$ and $B_{r,y} \cap X = \emptyset$, then $\mathbb{R}^n \backslash B_{r,y}$ is r-convex, showing r-hull(X)$\cap B_{r,y} = \emptyset$. Thus Proposition 29 can be applied to produce a (downward) closure operator closely resembling the dual by complementation of the r-hull.

Closure operators are known to stabilize in one iteration and work well with set operations, and in particular have applications for enhancing data structures. We have given many applications of the convolution for constructing closure operators. Because of the flexibility of defining the convolution it has unique value for data enhancement.

§Colorings and More Relative Homology

In material science applications, $X \subset \mathbb{R}^3$ may be made of $X_1, \ldots, X_k$ different substances. For instance composites are comprised of various materials, proteins contain various amino acids, molecular chains have different atoms, and so forth. Similarly, the region $X \subset \mathbb{R}^3$ may have multiple numerical qualities, such as temperature, composition densities, electrical properties, etc., justifying, $f_1, \ldots, f_k$ with $f_i: X \to \mathbb{R}^+$.

Using the general convolution notation where the dot subscript indicates the set is translated, in some embodiments one may compute quantities such as $\mathcal{H}((f_1 \wedge g_{1\bullet}) \vee (f_2 \wedge g_{2\bullet}) \vee ((f_1 \vee f_2) \wedge g_{3\bullet}))$ or others with arithmetic or set operations, to generate equivalence relations, numeric quantities, or iterations distinguishing the roles of individual $f_i$.

In the next example disjoint $X, Y \subset \mathbb{R}^3$ with Y having high genus are given. The iteration on X is offered to illustrate how to deform X to encircle Y. The iteration is designed so X grows stalagmites and stalactites without gravity but aimed at producing handles linking Y. Similar constructions may describe other evolution processes.

Example 42. For $X, Y \subset \mathbb{R}^3$ define an iteration on X evolving it to link or encircle handles or arms of Y.

Choose r>0 to be the reach of the attraction. Let G={ellipses of length$\leq$2r passing through {0}}. Choose a metric on G with $\int_G dg = 1$. Define $\xi: \mathbb{R}^3 \to \mathbb{R}^+$ by $$\xi(x) = \int_G \left(\mathcal{H}_1\left(B_{rx} \backslash Y, \frac{1}{2}\chi_X\right) - \mathcal{H}_1\left(B_{rx} \backslash Y, \frac{1}{2}\chi_X \vee g_x\right)\right) \cdot \mathcal{H}_0$$

$$(X \wedge g_x) \cdot \text{length}(X \wedge g_x) dg$$

Then $\xi(x)$ gives the average number of ellipses in G, that link Y in $B_{r,x}$, with preference for those that have linking homology distinct from $X \cap B_{r,x}$, weighted by their intersection number with X and the length of their intersection with X.

Next choose t>0 so the volume of $X \cup \xi^{-1}[t, \infty)$ increases from the volume of X by 5%, and repeat the iteration.

The example shows the interaction of distinct sets X,Y in $\mathbb{R}^3$. By replacing $B_{r,x}$ in the definition of $\xi(x)$ with $\mathbb{R}^3$, or by replacing $B_{r,x}$ with a weighted sum such as $$\frac{1}{2}\mathbb{R}^3 + \frac{1}{2}B_{r,x},$$

the ellipses that globally link Y would be counted with desired weight. Many more complicated problems on multiple sets or functions can be analyzed.

Figure 9:
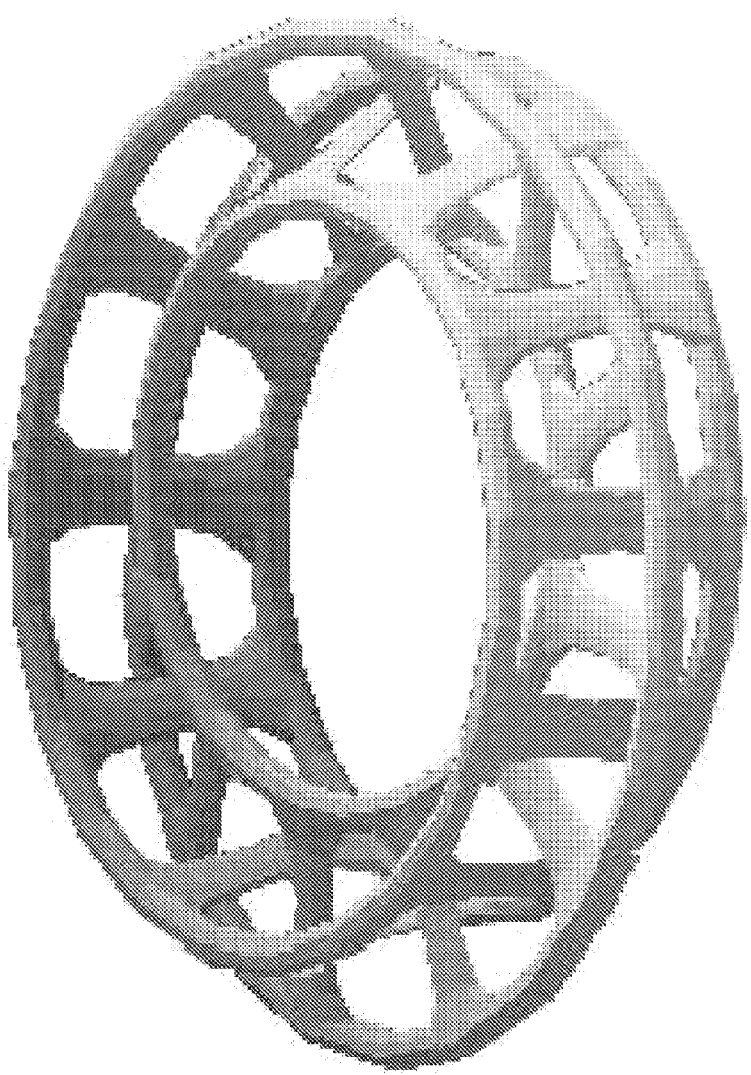
FIG. 9 illustrates an embedded 3-manifold with recognizable structure.

The FIG. 9 below shows an embedded handlebody. In addition to the topology of its compliment in $\mathbb{R}^3$, there is an underlying structure. Naming the structure, in precise term so that its class could be recognized by a computer, would be very difficult without our technology. Intuitively the configuration resembles a ladder, but goes twice around a large circle. Interestingly it twists a quarter turn on each revolution around the large circle, so that the rungs of the ladder on the second trip around the circle pass through the openings of the ladder from the first trip around. One could easily imagine the figure as one link in a chain of similar objects, or the rails and rungs of the ladder having finer substructures of braids, links, or handlebodies.

To analyze the figure one may apply the previous techniques to discuss the key features, such as the essential circular disks that have boundary in the ladder and span the holes of the ladder. Each disk would have one rung passing through it as an immersion. At this point one may prefer to not take the union of the disks, but may prefer to index the disks by their placement or directional orientation so that the chaining effect from one disk to the next remains available for further expression. In short, when the disks are added in the iteration they receive an index or color to keep them distinct so that subsequent iterations or equivalence relations have the full meaning at their disposal. Selecting such options may assist the investigator, within the context of all such 3-manifolds being considered, to elucidate and analytically recognize the key properties of interest.

The differentiating of sub-objects in $\mathbb{R}^n$ by coloring them, either from the original problem or through construction by iteration, is a special case of projecting an object from $\mathbb{R}^{n+m} \to \mathbb{R}^n$ while retaining the additional coordinates as the color. This is essentially also the strategy of the convolution bundle. One may try the map in the opposite direction, from $\mathbb{R}^n \to \mathbb{R}^{n+m}$. For instance if the last coordinate in $\mathbb{R}^n$ has an approximate period of p, the map $(x_1, \ldots, x_n) \to (x_1, \ldots, x_n, \cos(2\pi x_n/p), \sin(2\pi x_n/p))$ gives a higher dimensional object that can be manipulated to study its structure in terms of the period p.

Another attractive strategy given below may be preferred that extends the convolution.

Definition 43. Let $Y \subset \mathbb{R}^n$, Z an abstract topological space, and $\gamma: Y \to Z$. For $f: \mathbb{R}^n \to \mathbb{R}^+$ define $$\mathcal{H}(f; \gamma) = \int_0^\infty dim H(\gamma(Y \cap f^{-1}[t, \infty))) dt$$

and $$\langle f; \gamma \rangle(x) = \mathcal{H} \quad (f; \gamma_\bullet)(x) = \int_0^\infty dim H(\gamma(Y \cap (f^{-1}[t, \infty))_{-x})) dt$$

We have already seen this in one case: the relative homology integral $\mathcal{H}(f,X)$ is equivalent to defining $\gamma:\mathbb{R}^n\to\mathbb{R}^n/(X=\text{point})$ and writing $\mathcal{H}(f;\gamma)$. When $\gamma:Y\to Z$ is a topology quotient map we may write $\mathcal{H}(f;\sim_\gamma)$ as in the case $\mathcal{H}(f,X)=\mathcal{H}(f;X=\text{point})$.

For periodic motion in $\mathbb{R}^n$ it may be useful to define $\sim_p$ on $\mathbb{R}^n\times\mathbb{R}$ by relating the time coordinate as $(x,0)\sim(x,p)$. Here we have chosen to only identify certain pairs of points with last coordinates 0 or p. So for $X\subset\mathbb{R}^n\times\mathbb{R}$ the time path of an object X, $$\langle\overline{X},\sim_p\rangle_{(x,t)}\pm\mathcal{H}(\overline{X})$$

indicates that the position of X at times t and t+p intersect. This may be developed further to give a variety of ways of measuring local or approximate periodicity.

One may also define relations that detect periodicity in $\mathbb{R}^3$, such as in crystal symmetries. Another embodiment is to convolve with the projective space. Let $\gamma:B_r\to\mathbb{R}^{n-1}$ by identifying the antipodal points on $\partial(B_r)$. Then for $X\subset\mathbb{R}^n$, $\langle X;\gamma\rangle(x)$ is similar to $\langle X,B_r\rangle(x)$ except it connects antipodal points on the boundary of $B_{r,x}$.

§Tangent Space and Infinitesimal Topology

The next construction will generalize much of the technology mentioned thus far and enable the added versatility to incorporate vector spaces, differential forms and related ideas in the technology. First we begin with noting a slight weakness with the sand accumulation simulation in Example 22. Consider a downward cone, as in the example, with the vertex removed. The iteration given applies to compact sets, and does not instate the vertex. A preferred convolution will look at a neighborhood of the vertex, in the limiting case as the neighborhood gives the germ at the vertex, and see if the cone in the germ is solidly filled so that the sand may accumulate, adding the vertex point.

Before proceeding to generality some introductory remarks are needed that will be helpful later. If $X\subset\mathbb{R}^n$ is a smooth or piecewise smooth CW-complex, one may consider $T(X)\subset T(\mathbb{R}^n)$ and apply the techniques mentioned earlier to $T(X)$ as a total space or as a fiber bundle. For example in the former case, if X is a soap film in $\mathbb{R}^3$, and $UT_0(\mathbb{R}^n)$ denotes the unit tangent space at the origin, then for $(x,v)\in T(\mathbb{R}^n)$, $\langle T(X),UT_0(\mathbb{R}^n)\rangle_1(x,v)$ for $|v|<1$ will be 1,2,3 or 0, depending whether x is in a 2-cell, 1-cell, 0-cell, or $x\notin X$, respectively.

For piecewise smooth CW-complexes $X\subset\mathbb{R}^n$, the topological and metric information at x is contained in $UT_x(\mathbb{R}^n)\cap T_x(X)$. If various cells are attached at x, their positional spacing and homology on the unit tangent sphere may be quantified using the convolution $\langle,\rangle$. Choosing $Y\subset UT_0(\mathbb{R}^n)$ or preferably $g:UT_0(\mathbb{R}^n)\to\mathbb{R}^+$ and writing $\langle T(X),g\rangle(x,0)$ expresses the topology and spatial orientation of $T_x(X)$ as determined by g. Also, $G=\{g\circ\rho|\rho\in SO(\mathbb{R}^n)\}$ is a bundle of directional information $\langle T(X),G\rangle(x,0,g)$.

An embodiment of this section in some ways generalizes on T(X). In terms of the analogy we will begin with what would be the tangent space at the origin.

Definition 44. Let $I\in\mathbb{R}$ be an interval. Let $P_0$ denote the set of piecewise-smooth functions $\tau:\mathbb{R}^n\times I\to\mathbb{R}^+$. Call these processes on $\mathbb{R}^n$.

For $f:\mathbb{R}^n\to\mathbb{R}^+$, $\tau:\mathbb{R}^n\times I\to\mathbb{R}^+$, $t_0\in I$, we may consider the existence and values of the following limits:

· $\lim_{t\to t_0}\mathcal{H}(f\cdot\tau(t))$

· $\left.\dfrac{d}{dt}\right|_{t_0}\mathcal{H}(f\cdot\tau(t))$

· $\left.\dfrac{d^2}{dt^2}\right|_{t_0}\mathcal{H}(f\cdot\tau(t))$

The limits may be taken from above or below, and higher order derivatives, integrals and other quantities may be considered.

Proposition 45. Let $f:\mathbb{R}^n\to\mathbb{R}^+$ be smooth, and $v\in T_0\mathbb{R}^n$ a tangent vector, with identification $v=\exp_0(v)\in\mathbb{R}^n$.

Define $\tau\in P_0$ for $t\neq 0$ by $\tau_t = \dfrac{1}{t}(\chi_{\{v/t\}}-\chi_{\{0\}})$.

Then $$\lim_{t\to 0}\mathcal{H}(f\cdot\tau(t)) = (v(f),0,\ldots,0)$$

Or define $\tau\in P_0$ by $\tau_t=\chi_{\{v/t\}}-\chi_{\{0\}}$. Then $$\left.\frac{d}{dt}\right|_0 \mathcal{H}(f\cdot\tau(t)) = (v(f),0,\ldots,0)$$

showing these elementary processes recover the directional derivative.

Proposition 46. Let $X\subset\mathbb{R}^n$ be a smooth n-manifold with boundary, and let $f:\mathbb{R}^n\to\mathbb{R}^+$ be smooth. Define $$\tau\in P_0 \text{ for } t\neq 0 \text{ by } \tau_t = \frac{1}{t^n}\chi_{(t\mathbb{Z})^n}.$$

Then $$\lim_{t\to t_0}\mathcal{H}(X\cdot\tau(t))_0 = vol(X)$$

$$\lim_{t\to t_0}\mathcal{H}(f\cdot\tau(t))_0 = \int_{\mathbb{R}^n} f\, dx$$

Proof: X and f are smooth and so Riemannian integration applies. ∎

Advancing from functions on discrete points to the characteristic function on a sphere Proposition 47. Let $f:\mathbb{R}^n\to\mathbb{R}^+$ be smooth, $p\in\mathbb{R}^n$ a regular point of f, and $\tau(t)=\chi_{\partial(B_t^{t,p})}$. Then $$\left.\frac{d}{dt}\right|_0 \mathcal{H}(f\cdot\tau(t)) = (|grad_p(f)|,0,\ldots,0,-|grad_p(f)|)$$

In this example if f is not regular at p or f is only piecewise-smooth, various other homology dimensions will show-up non-zero and may be used to provide information related to the index of the singularity. Processes other than $\partial B_{t,p}$ and process pairs for relative homology may also be used as in the proposition to define local characteristics of piecewise smooth f. Processes may also be used for describing foliation properties and their singularities.

Theorem 48. Let $X\subset\mathbb{R}^n$ and $f:\mathbb{R}^n\to\mathbb{R}^+$ be such that X and X·f have finite homology. Define $\tau(t)(x)=t+f(x)$. Then $$\frac{d}{dt}\mathcal{H}(X\cdot\tau(t)) = dim H(X)$$

Proof:

$$\mathcal{H}(X \cdot \tau(t)) = \int_{s=0}^{\infty} dimH(t\chi_X + f\chi_X)^{-1}[s, \infty)ds =$$

$$\int_{s=0}^{t} dimH(X)ds + \int_{s=t}^{\infty} dimH(t\chi_X + f\chi_X)^{-1}[s, \infty)ds =$$

$$t \cdot dimH(X) + \int_{0}^{\infty} dimH(f\chi_X)^{-1}[s, \infty)ds$$

Thus $\frac{d}{dt}\mathcal{H}(X \cdot \tau(t)) = dimH(X)$

Thus far we have seen a variety of quantities that may be measured by $$\frac{d}{dt}\mathcal{H}(f \cdot \tau(t)) \text{ or } \frac{d}{dt}\mathcal{H}(X \cdot \tau(t)),$$

namely the directional derivative, volume, gradient, singular information, and homology of f or X. Other quantities such as arc length, area, sectional curvature may be expressed. Depending on the process, several of these examples give the quantity on f only at the point $0 \in \mathbb{R}^n$, pointing out the oppertunity to convolve with processes. If $\tau \in P_0$, we may convolve with $\tau$ as in $$\frac{d}{dt}\langle f, \tau(t)\rangle(x) =$$

$$\frac{d}{dt}\mathcal{H}(f \cdot \tau(t)_x) = \frac{d}{dt}\int_{s=0}^{\infty} dimH(y \mapsto (f(y) \cdot \tau(t)(y-x)))^{-1}[s, \infty)ds$$

Convolving with processes is a general case of convolving with functions, for if $\tau \in P_0$ is a constant process then $\lim_{t \to 0}\langle f,\tau(t)\rangle = \langle f,\tau(0)\rangle$.

Our next goal is similar to convolving with processes except that the process should change dependent upon where it is translated. With $P_0$ the set of processes at 0, $P_x = (P_0)_x$ will denote the processes at x. An alternative embodiment puts $P_x$ to be the set of processes on $T_x(\mathbb{R}^n)$, and they are applied to $\mathbb{R}^n$ via $\exp_x$.

Definition 49. Define $P = \{P_x | x \in \mathbb{R}^n\}$ to be the process bundle on $\mathbb{R}^n$, and call a section of this bundle a process field. Thus for each process field $\tau \in P$, each $x \in \mathbb{R}^n$, let $\tau_x \in P_x$ denote the process of $\tau$ at x.

Generally some smoothness conditions on how a process field varies with x may be imposed. The mentioned example of the directional derivative shows for any vector field $\zeta$ on $\mathbb{R}^n$, there is a $\tau \in P$ with $\zeta(f) = \lim_{t \to 0}\mathcal{H}(f\cdot\tau(t))$. Process fields $\tau,\sigma$ in P may be combined with arithmetic or set operations and applied to $f: \mathbb{R}^n \to \mathbb{R}^+$ in a variety of ways as with convolution, such as by defining $\lim\mathcal{H}(f\cdot\wedge\tau)(x) = \lim\mathcal{H}(f\wedge\tau_x)$, with relative homology by defining $\lim\mathcal{H}(f\cdot\tau,\sigma)(x) = \lim\mathcal{H}(f\cdot\tau_x, \sigma_x($, and other more elaborate expressions. The resulting n+1 dimensional information at each point $x \in \mathbb{R}^n$ may then be composed with the Euler sum, a projection onto a specific homology dimension, or other functions if desired.

The process fields may be applied as a very versatile embodiment of the homology integral. For $\tau \in P$ a process field, the special case where $\tau_{x,t}$ is constant in t and x the homology integral $\mathcal{H}(f\wedge\tau) = \langle f,\tau\rangle$. For general $\tau \in P$ we may take $\lim\mathcal{H}(f\wedge\tau)$ to generate a diverse range of data on the structure of f. These applications may generalize on homology, the homology integral, convolutions, and on differential geometry quantities such as vector fields, and so offer a natural method for combining our new methodology with the tools of differential geometry.

§Applications for Medicine and Industry

The methods in this disclosure have many applications including comparing geometrical configurations in $\mathbb{R}^3$. One advantage is that we may now define morphology characteristics not expressed within traditional mathematics, and apply this to describe a multitude of observed objects micro-biology and in the world at large. The techniques apply to evaluation generally for objects in $\mathbb{R}^3$ or other dimensions. Data or images may be enhanced, structures can be classified or given numerical values, and dynamic patterns can be modeled and predicted.

In three-dimensional space, applications in material science such as counting the local handlebody density in polymers and bone samples are illustrated in §Convolution Bundles. This tool of local homology may have applications for configurations found in material science and molecular biology. Topologically nontrivial objects occur frequently with spatially arranged homology features. Materials often have textures that upon close examination may be quantified and compared using this new local homology technique. This applies to data sampling of multi-dimensional objects in other settings as well as in $\mathbb{R}^3$. Even when $X \subset \mathbb{R}^n$ is a union of discrete contractible components, such as an aggregate in a composite, polymer strands, molecule and protein arrangements, or data points, the contractible components will often be arranged with an overall structure. Thickening X with procedures like $X_r$ or others from §Iteratons will produce continuously indexed families of structures. Selecting $g_{r,x}$ and applying invariants and equivalence relations on $\langle X, g_{r,x}\rangle$ may be applied to determine the spatial arrangement of the homology features, and other complex patters found in the spatial configuration of X.

In medicine the bone example giving directional homology density applies to studying other tissues by locally labeling the matter $f_1, \ldots, f_k: \mathbb{R}^3 \to \mathbb{R}^+$ according to its composition densities, and investigating homology convolutions, in particular as in §Colorings. Studying brain pathways, abnormal tissue development, classifying tumors, and tracking tissue healing are some possible applications. Synthetic tissue scaffolding may be manufactured with improved morphology for promoting the cell growth. The methods apply also to microscopic scales, to quantifying variations in structural compositions of molecular biology. The folded DNA chain sequences may be given useful numerical characteristic by applying the methods. Another extremely useful application is for designing drugs to target certain cells or tissues. The techniques here may enable quantitative descriptions of receptors and targets so that the drugs may be delivered more accurately.

For material science, the methods apply to give numerical quantities describing the morphology of composites. Polymers or blends often form a matrix surrounding aggregates, fibers, voids or another polymer matrix. These structures can become quite complex with local and directional homology features relating to the overall strength and qualities of the material. By naming the convolutions that give the numerics that correspond to the desired overall performance of the material, the engineer develops a compass for synthesizing new materials and selecting which old materials that are expected to perform well, and moreover by studying the relationship between the named convolutions and the actual performance, new insights into the underlying mechanisms in the material that generate the desired performance can be known.

In addition to objects in $\mathbb{R}^3$, data from $\mathbb{R}^n$ may be manipulated with the methods from the previous sections. Multichannel or locally periodic electronic communications, stock market indicators, color photographs, weather data and many other examples can be given where the underlying form of the image locally has connectivity structure and topological features that can be emphasized or quantified by the various methods given. With the automation of data collection, the availability of many forms of medical and microscopic imaging, and the capacity for new computers, software written to calculate the homology integral, the convolution, and other techniques described, may be a great assistance in many fields for interpreting data analytically.

§Software Implementation

Figure 10:
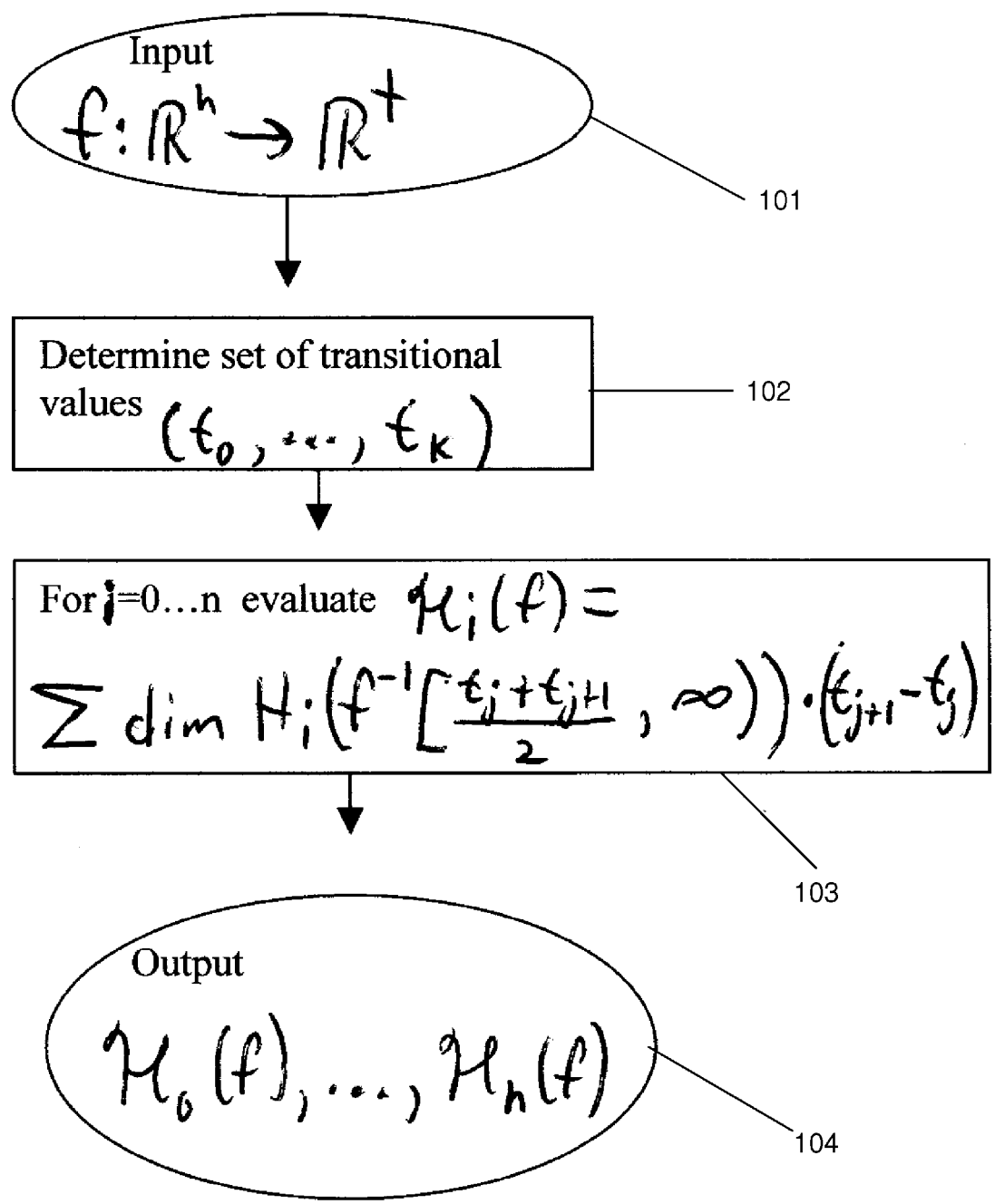
FIG. 10 is a flow chart of a first embodiment computing process.
Figure 11:
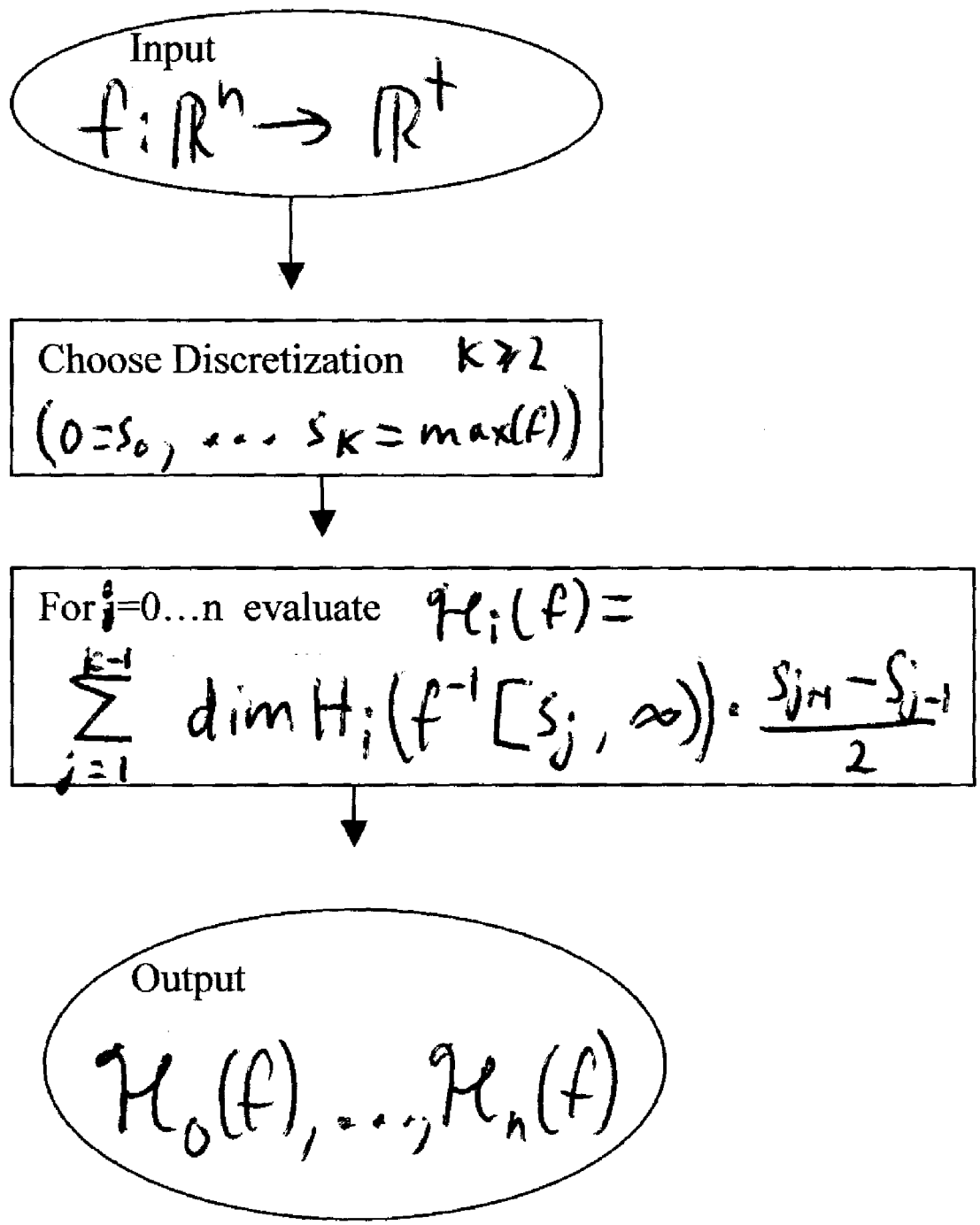
FIG. 11 is a flow chart of a second embodiment computing process.
Figure 12:
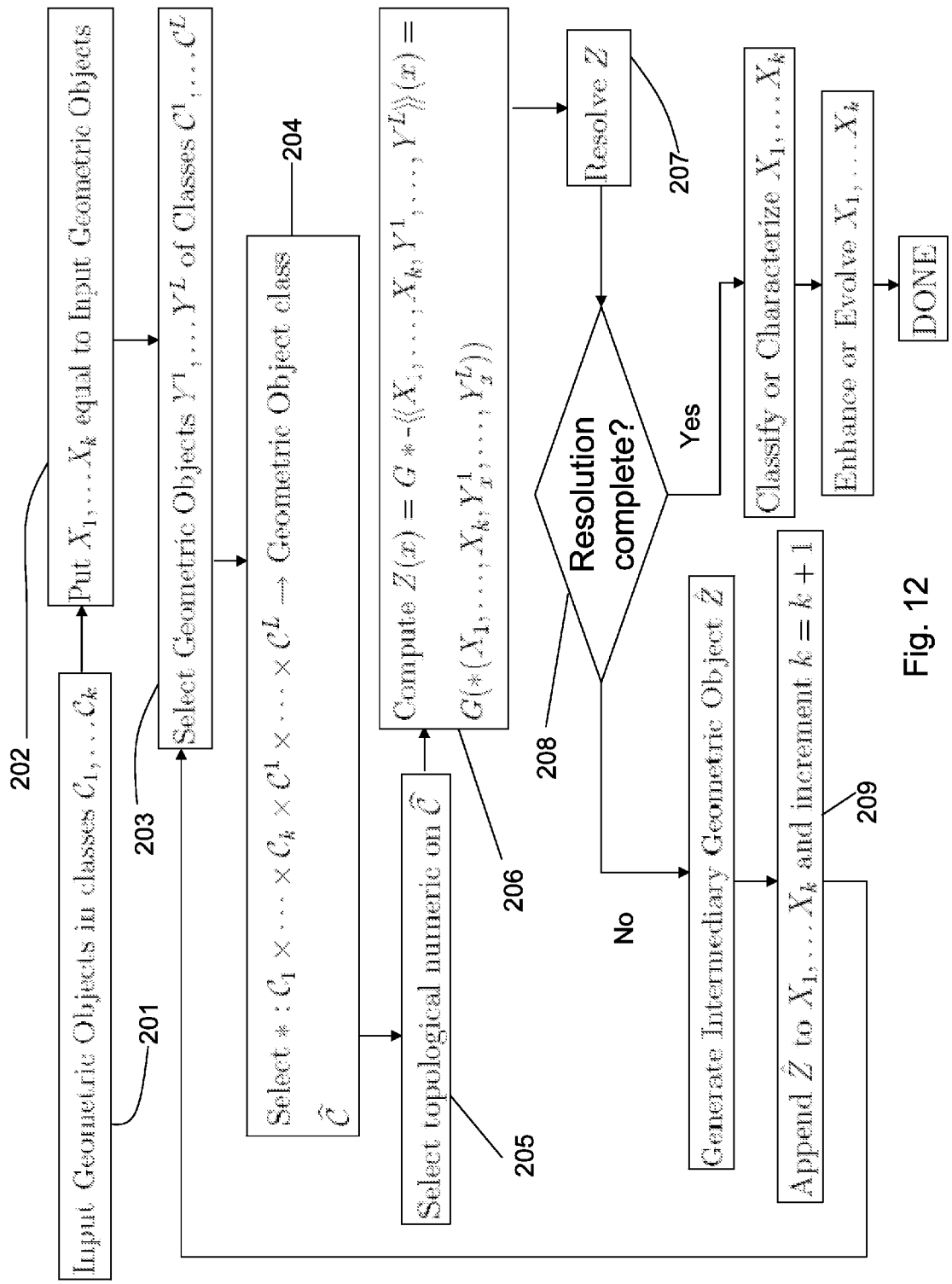
FIG. 12 is a flow chart of a third embodiment computing process.

In FIG. 10, an embodiment program flow chart is shown for determining the homology integral $\mathcal{H}$. A program performing the steps indicated in FIG. 10 may be loaded into the memory of a computer for execution by a processor. The program may be written in any suitable programming language to implement the previously described mathematical algorithms and procedures. In step 101, a computer may receive the world data that will be evaluated. The data may have originated from medical imagery equipment, from multi-variable observations or experiments of any sort, from financial data, or from other sources. The data may have been pre-processed or converted to more usable formats. The data may have been delivered from another computer, or output from programs or subprograms from the same computer system. The data may come from any source.

The data is symbolized in FIG. 10 by $f: \mathbb{R}^n \to \mathbb{R}^+$, which may be read "f is a function that assigns to each point $x=(x_1, \ldots, x_n)$ in $\mathbb{R}^n$ a value $f(x)$ that is a positive number or zero." For example, a three-dimensional medical image showing the density of tissue may be $f: \mathbb{R}^3 \to \mathbb{R}^+$, with $f(x)=f(x_1,x_2,x_3)$=the density of the tissue at point x.

There are many simplifications and conventions related to software requirements and others for representing f. Often f will provide values on a bounded region of space, and outside that region f may implicitly take the value 0. The bounded region values may be given on a discretized or pixilated points in space, or may be given symbolically by specifying node points and splines. For example in certain embodiments, a piecewise linear, NURBS, or other representation of Graph(f) $\subset \mathbb{R}^n$ may be provided. Combinations of these and other methods may be used to represent f.

In some embodiments, in place of inputting $f: \mathbb{R}^n \to \mathbb{R}^+$, a set $X \subset \mathbb{R}^n$ may be input. It will be understood that this variation may be included throughout the instant disclosure by putting $f=\chi_X$ so $f(x)$ is equal to 1 when $x \in X$ and $f(x)$ equal to 0 when $x \notin X$. This function is called the characteristic function of X. In various embodiments, when f is a characteristic function it may be represented in the form of the underlying set.

In some embodiments, f may be input with $f: \mathbb{R}^n \to \mathbb{R}$ so assigns possible negative values to points. In other embodiments, the program may perform a mapping function so that negative values in the dataset are mapped to positive values or zero.

In step 102 of FIG. 10 the transitional values are described in Definition 4. In certain embodiments the set $(t_0, \ldots, t_k)$ may include the transitional values and optionally some additional values. Theorem 6 gives a method for determining such a set $(t_0, \ldots, t_k)$, by finding the points where the partial derivatives of f and f along its boundary are zero. Software is available to calculate the partial derivatives, and such software or its equivalent may be implemented in the instant program code.

In step 103 the formula is described in Proposition 5 and Theorem 6. Generally the summation is calculated for each homology index i. In some embodiments the calculation may be done for only select values of i. The $$f^{-1}\left[\frac{t_j + t_{j+1}}{2}, \infty\right)$$

may be seen to represent the contour slice of the graph of f at height midway between the transitional values $t_j$ and $t_{j+1}$. and $\dim H_i$ $$\left(f^{-1}\left[\frac{t_j + t_{j+1}}{2}, \infty\right)\right)$$

may be seen to represent the homology Betti numbers of this slice, and $(t_{j+1}-t_j)$ may be seen to represent the interval length between $t_j$ and $t_{j+1}$.

As step 103 was carried out for each $i=0, \ldots, n\ n+1$ values are provided. For $i=n$ the value $\mathcal{H}_n(f)$ will be zero for standard f, so this term may be omitted from the flow chart. As mentioned following Definition 10, in various embodiments we may substitute relative homology for homology, and it will be understood that this substitution may be performed throughout the instant disclosure. In the case of relative homology the $n^{th}$ Betti number may be non-zero, and so the case $i=n$ is included in the flow chart.

In some embodiments, in place of $\dim H_i$ cohomology Betti numbers $\dim H^i$ may be employed.

Figure 13:
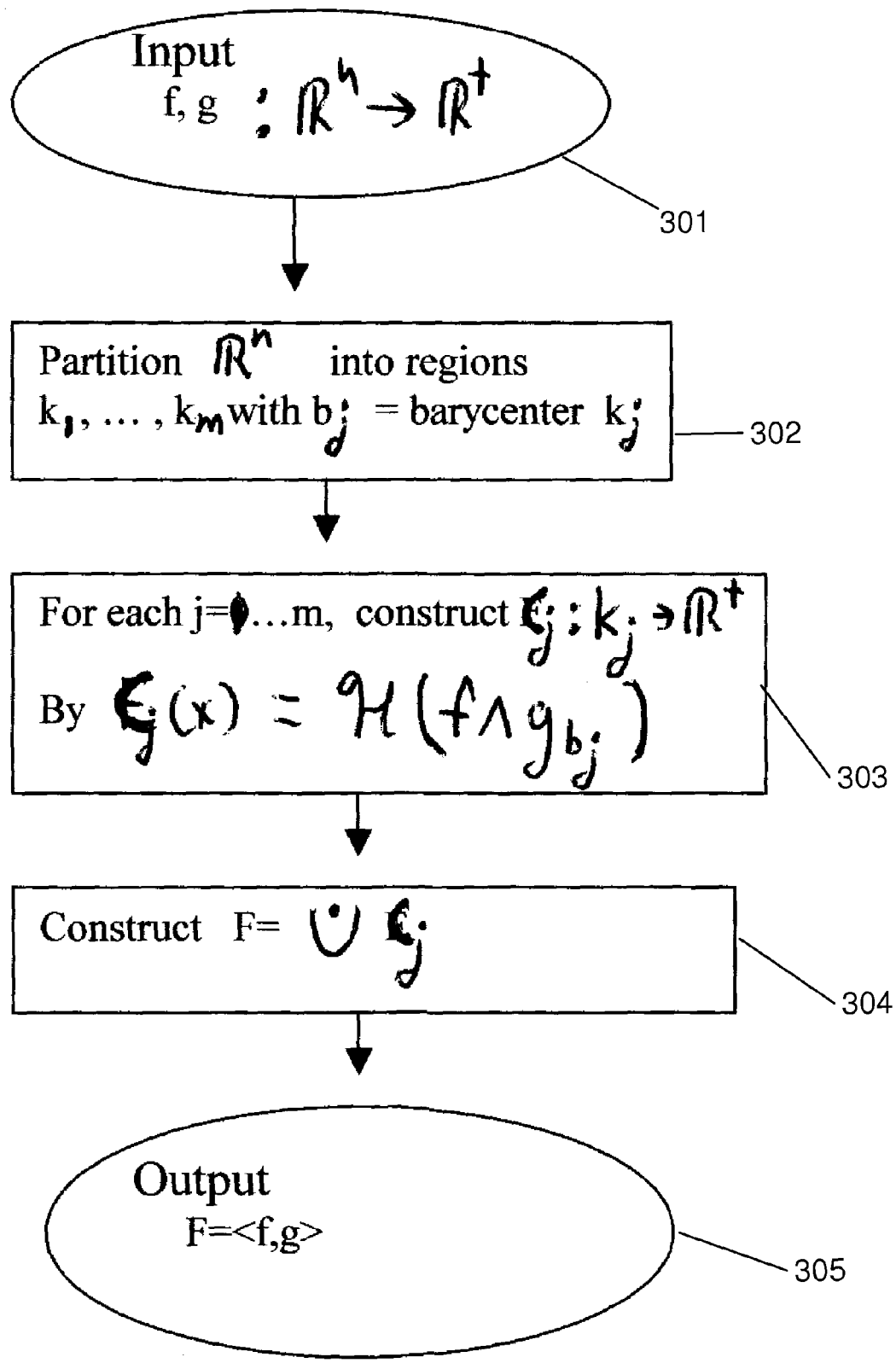
FIG. 13 is a flow chart of a fourth embodiment computing process.
Figure 14:
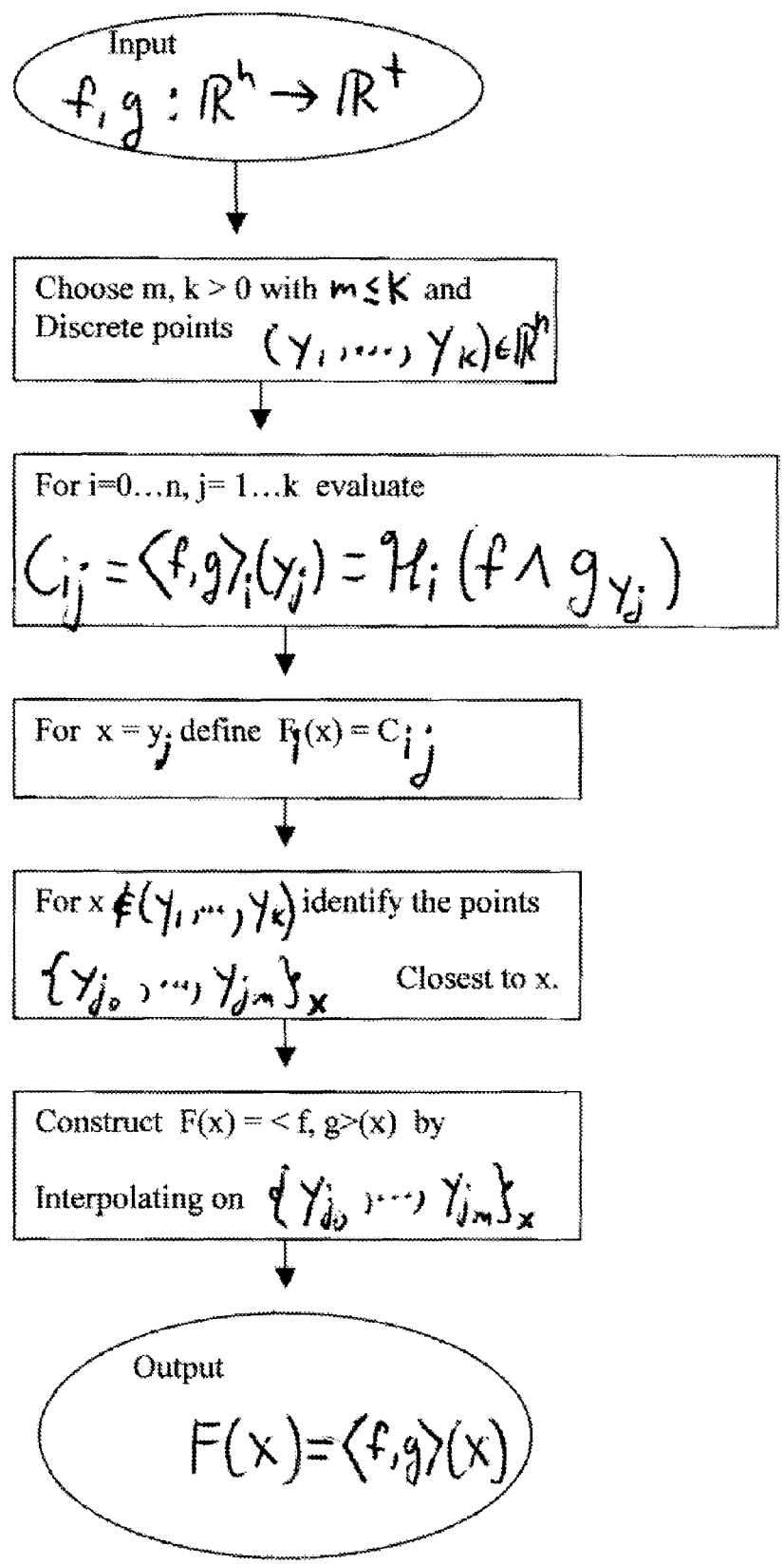
FIG. 14 is a flow chart of a fifth embodiment computing process.
Figure 15:
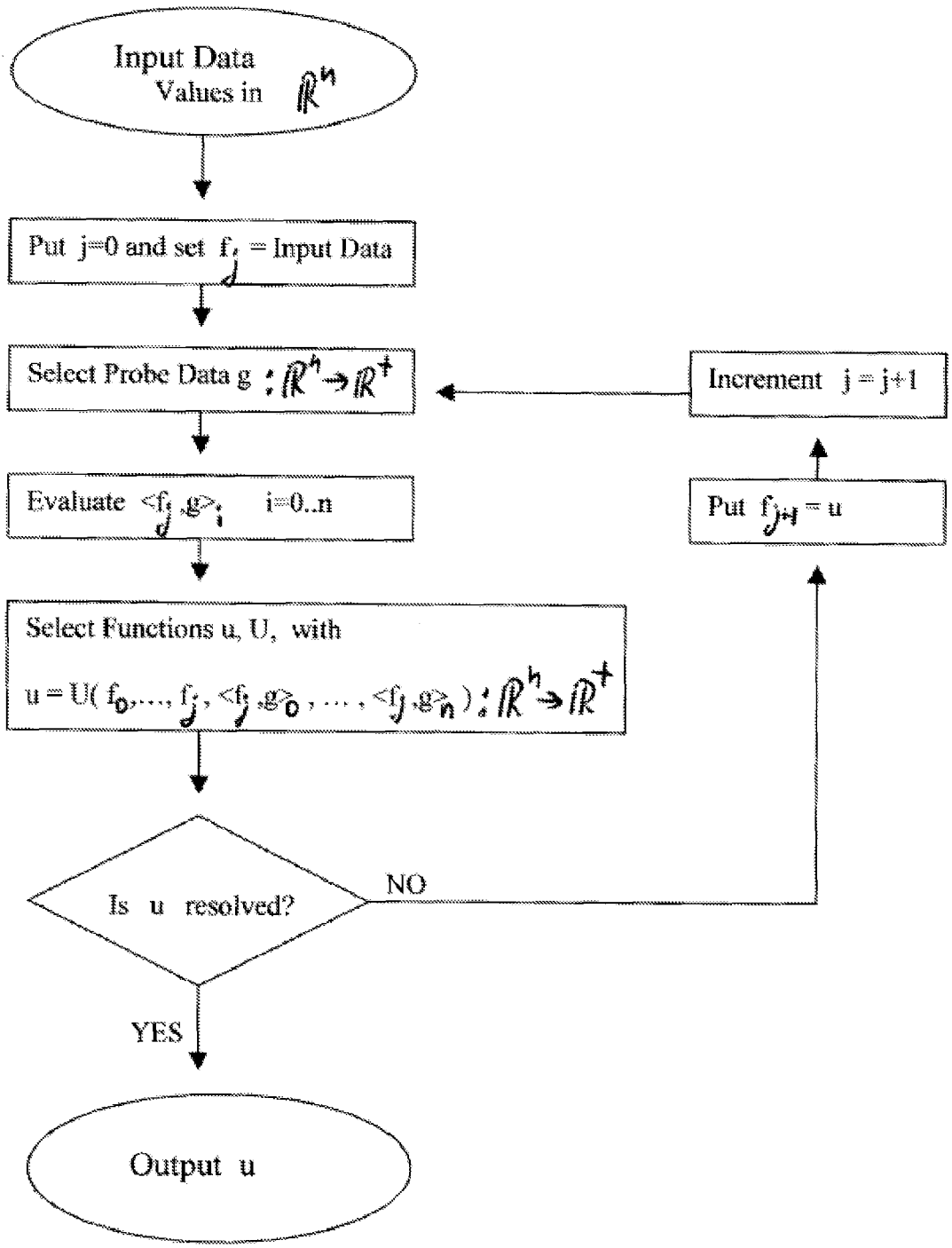
FIG. 15 is a flow chart of a sixth embodiment computing process.
Figure 16:
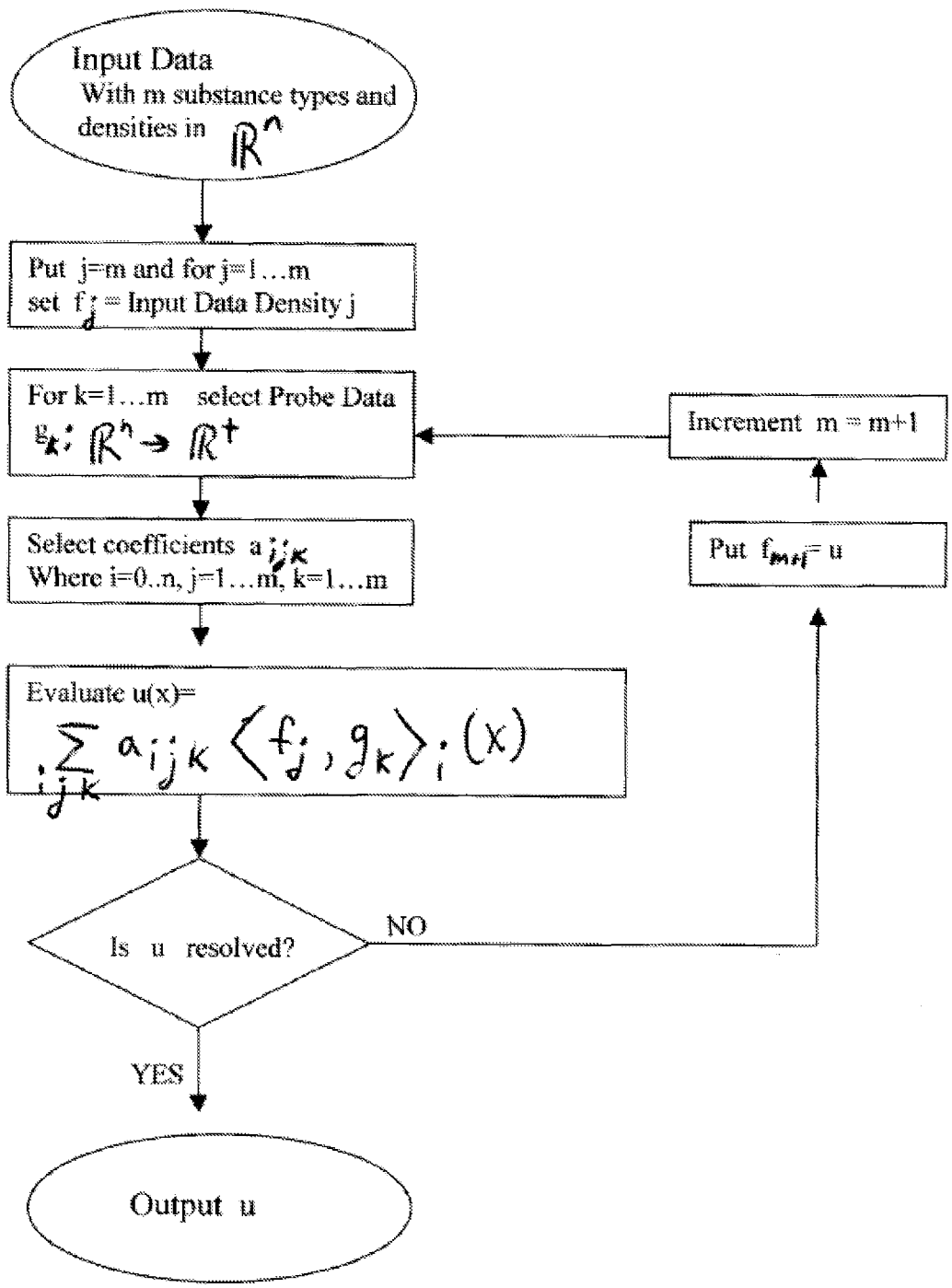
FIG. 16 is a flow chart of a seventh embodiment computing process.

FIG. 13 shows another embodiment data processing steps that may be coded into a program for execution by a computer. Step 301 shows two functions $f: \mathbb{R}^n \to \mathbb{R}^+$, and $g: \mathbb{R}^n \to \mathbb{R}^+$. Either f or g or both may be supplied in any of the various embodiments described for the input data in step 101 of the previous embodiment processing steps. The data f may be, for example, the world data to be analyzed and the data g may be the probe data selected by the user. In other embodiments these roles for f and g may be reversed, or the data may be input for any purpose. In certain specific embodiments the computer program code may include additional routines that enable a user to select, modify, or create the probe g, the dataset f or both. For example, the program code may include routines that enable the user to mathematically define the probe g. Or, a CAD program or the like may enable the user to build the probe g that is defined by vertex points or the like. Or, the program code may permit a user to build the probe g as a discretized dataset, such as an n-dimensional, pixelated structure. For example, the program code may include an editor or the like that enables the user to generate the probe g as a series of three-dimensional pixels that together define a shape or homological characteristic that is to be tested against. Although complex, the design of such user interfaces are broadly known, and providing such logical interfaces should be possible for one of reasonable skill in the art without undue experimentation after having the benefit of the instant disclosure.

As shown in step 302, in various embodiments the partition of $\mathbb{R}^n$ may divide $\mathbb{R}^n$ into distinct sets, so that their union may be all of $\mathbb{R}^n$. In other embodiments the partition may only include a neighborhood of the support of f and g, sufficient to include all points x where $f \wedge g_x \neq 0$, i.e. all points x so that the contour slices of g shifted by x and the contour slices of f do not intersect above the height=0 plane, for example. In some embodiments other partitions may be used. In certain particular embodiments the partition may be selected so that $\mathcal{H}(f \wedge g_x)$ is constant on each set of the partition.

The points $b_j$ may be selected, for example, as the barycenter of $k_j$. Any other suitable centers or means of selecting a point $b_j$ in $k_j$ for each j may also be used.

In step 303 for each partition set $k_j$ and selected point $b_j$ in $k_j$, a function $C_j$ with domain $k_j$ may be constructed. In certain embodiments $C_j$ may be a constant function, assigning each point in $k_j$ the indexed values $\mathcal{H}(f \wedge g_{b_j}) = (\mathcal{H}_0(f \wedge g_{b_j}), \ldots, \mathcal{H}_n(f \wedge g_{b_j}))$. For each i=0, ..., n this would mean $C_{ji} = \mathcal{H}_i(f \wedge g_{b_j})$. The function $C_j$ may be represented in a computer in any form suitable for functions. It may be preferable to represent $C_j$ as an indexed constant function by using a representation for the set $k_j$ and having a rule that associates to the elements of $k_j$ the values $\mathcal{H}_i(f \wedge g_{b_j})$, for i=0, ..., n.

Step 304 shows that a function F may be assembled as the disjoint union of the $C_j$. So $F_i(x) = C_{ji}$, where j is selected according to the region $k_j$ containing x. If the partition does not cover $\mathbb{R}^n$ then F may return the value (0, ..., 0) outside the partition. The function F may be represented in any form suitable for functions. It may be represented in a form suitable for an indexed family of step functions, such as a rule containing the partition information and the constant Betti numbers assigned to each set in the partition.

In step 305 F is output as ⟨f,g⟩, and so $F_i(x)$ is the value for ⟨f,g⟩$_i(x)$.

All references cited in the specification, both patent publications and non-patent publications, are indicative of the level of skill of those skilled in the art to which this invention pertains. All these publications are herein fully incorporated by reference to the same extent as if each individual publication were specifically and individually indicated as being incorporated by reference. It should be understood in the instant disclosure that each instance of the terms "data," "dataset" or "function" may be interchangeable with each other throughout the instant disclosure unless otherwise clear to one of reasonable skill in the art that such a substitution would be inconsistent with the disclosure at that specific instance.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A computer system comprising:
   at least a processor;
   an output system controllable by the at least a processor for providing output information; and
   a memory in communications with the at least a processor, the memory comprising program code executable by the at least a processor for causing the at least a processor to perform the following steps:
   inputting into the memory a geometric object;
   computing a G-integral of the geometric object, where G is a topological invariant numerical function; and
   outputting to the output device a result corresponding to the computed G-integral to characterize at least a topological or geometrical characteristic of the geometric object.

2. The computer system of claim 1 wherein G-integral is the homology integral or relative homology integral, and the geometric object is a fuzzy set, a set with composition density, or a function.

3. The computer system of claim 2, wherein the geometric object is a function, and the G-integral is the homology integral or the relative homology integral that is computed using an arithmetic combination of homology Betti numbers or relative homology Betti numbers.

4. The computer system of claim 3 wherein the Betti numbers are evaluated on sets, the sets corresponding to preimages of the function.

5. The computer system of claim 4, wherein the preimages are evaluated on intervals $A_i$, and the arithmetic combination comprises $\dim H_j(f^1(A_i))$ for a plurality of different $A_i$.

6. The computer system of claim 1 wherein computing the G-integral comprises:
   performing a plurality of Betti number calculations for the geometric object; and
   arithmetically combining at least the Betti numbers.

7. A computer system comprising:
   at least a processor;
   an output system controllable by the at least a processor for providing output information; and
   a memory in communications with the at least a processor, the memory comprising program code executable by the at least a processor for causing the at least a processor to perform the following steps:
   inputting into the memory two or more geometric objects;
   evaluating a convolution of the two or more geometric objects; and
   outputting to the output device a result characterizing at least a topological or geometrical property of at least one of the geometric objects according to the evaluation of the convolution of the two or more geometric objects;
   wherein the convolution is calculated using at least numeric quantities given by computations of an algebraic topological invariant.

8. The computer system of claim 7 wherein at least one of the geometric objects is input in at least part from an imaging device.

9. The computer system of claim 7 wherein multiple convolutions of geometrical objects are computed and the result is combined into a geometric object.

10. The computer system of claim 7 wherein a geometric object is computed that in turn is used for the computation of another convolution.

11. The computer system 7 wherein the convolution is the homology convolution and has * function which is either multiplication or taking the minimum.

12. The computer system of claim 7 wherein the topologic invariant is one of homology, cohomology, relative homology, relative cohomology, homotopy groups, K-theory, generalized homology, or generalized cohomology.

13. The computer system of claim 12 wherein the numeric quantities are calculated from the dimension of the homology, cohomology, or relative homology at at least one index.

14. A computer system for evaluating a geometric object A, the computer system comprising:
   at least a processor;
   an output system controllable by the at least a processor for providing output information; and
   a memory in communications with the at least a processor, the memory storing the geometric object A and further comprising program code executable by the at least a processor for causing the at least a processor to perform the following steps:
1) obtaining geometric objects $B_1$ and $B_2$;
2) obtaining indices $i_1$ and $i_2$ that are both greater than zero;
3) computing data representing sets $C_1$ and $C_2$, where $C_1$ is calculated with algebraic or set operations that utilize at least A and $B_1$, and $C_2$ is calculated with algebraic or set operations that utilize at least A and $B_2$;
4) computing the $i_1$ index Betti number of $C_1$ and the $i_2$ index Betti number of $C_2$, wherein the Betti numbers are associated with a topological invariant;
5) arithmetically combining the at least two Betti numbers obtained from step (4) to produce a geometric object D; and
6) outputting to the output device a result obtained from the geometric object D to characterize topological or geometric properties of geometric object A.

15. The computer system of claim 14 wherein $B_1=B_2$.

16. The computer system of claim 14 wherein the topological invariant is selected from a set consisting of homology, cohomology, relative homology, relative cohomology, homotopy groups, K-theory, generalized homology, or generalized cohomology.

17. The computer system of claim 14 wherein arithmetically combining the at least two Betti numbers includes adding, averaging, or weighted averaging of the at least two Betti numbers.

* * * * *